US009538579B2

(12) United States Patent
Song et al.

(10) Patent No.: US 9,538,579 B2
(45) Date of Patent: *Jan. 3, 2017

(54) RESOURCE MAPPING FOR MULTI SIM MULTI ACTIVE MULTI RAT SCENARIOS USING WLAN TRANSCEIVER SUPPORTING PARTIAL WWAN TRANSCEIVER CAPABILITIES

(71) Applicant: QUALCOMM Incorporated, San Diego, CA (US)

(72) Inventors: Bongyong Song, San Diego, CA (US); Soumya Das, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/699,860

(22) Filed: Apr. 29, 2015

(65) Prior Publication Data

US 2016/0323933 A1 Nov. 3, 2016

(51) Int. Cl.
*H04B 1/38* (2015.01)
*H04M 1/00* (2006.01)
(Continued)

(52) U.S. Cl.
CPC ............ *H04W 88/06* (2013.01); *H04W 68/02* (2013.01); *H04W 84/12* (2013.01)

(58) Field of Classification Search
CPC . H04B 1/3816; H04M 2250/14; H04W 88/02; H04W 88/06
(Continued)

(56) References Cited

U.S. PATENT DOCUMENTS

2004/0176134 A1* 9/2004 Goldthwaite ........ G06K 7/0004
455/558
2006/0234693 A1* 10/2006 Isidore .............. H04M 1/72519
455/422.1
(Continued)

FOREIGN PATENT DOCUMENTS

GB 2525475 A 10/2015
WO WO 2014/110803 A1 7/2014
(Continued)

OTHER PUBLICATIONS

ISA/EPO, International Search Report and Written Opinion of the International Searching Authority, Int'l. App. No. PCT/US2016/026493, Jun. 16, 2016, European Patent Office, Rijswijk, NL, 11 pgs.

*Primary Examiner* — Simon Nguyen
(74) *Attorney, Agent, or Firm* — Holland & Hart LLP

(57) ABSTRACT

In a user equipment (UE) supporting multiple radio access technologies (RATs) and operating in an multiple-SIM multiple-active (MSMA) scenario, at least a portion of the wireless local area network (WLAN) transceiver may be used opportunistically to support the operation of the wireless wide area network (WWAN) transceiver to support the multiple subscriber identity modules (SIMs). For example, when a first SIM is in an active mode and using the WWAN transceiver for transmit and/or receive operations, at least a portion of the WLAN transceiver may be used in addition to the WWAN transceiver to support the WWAN operation of a second (or third, etc.) SIM. The WLAN transceiver may be used for transmit, receive, or both for the second SIM, while the first SIM continues to use the resources of the WWAN transceiver.

30 Claims, 27 Drawing Sheets

(51) Int. Cl.
*H04W 88/06* (2009.01)
*H04W 68/02* (2009.01)
*H04W 84/12* (2009.01)

(58) Field of Classification Search
USPC .................................. 455/557–558
See application file for complete search history.

(56) References Cited

U.S. PATENT DOCUMENTS

| 2009/0131054 | A1* | 5/2009 | Zhang | H04W 76/04 455/436 |
|---|---|---|---|---|
| 2010/0008339 | A1* | 1/2010 | Huang | H04W 48/18 370/338 |
| 2011/0021173 | A1* | 1/2011 | Randhawa | H04W 4/22 455/404.1 |
| 2011/0217969 | A1 | 9/2011 | Spartz et al. | |
| 2012/0135715 | A1* | 5/2012 | Kang | H04W 8/183 455/412.1 |
| 2013/0005394 | A1 | 1/2013 | Geary et al. | |
| 2013/0029720 | A1* | 1/2013 | Clevorn | H04L 1/02 455/552.1 |
| 2013/0150111 | A1 | 6/2013 | Su et al. | |
| 2013/0157717 | A1 | 6/2013 | Yu et al. | |
| 2013/0329639 | A1 | 12/2013 | Wietfeldt et al. | |
| 2014/0146732 | A1 | 5/2014 | Olufunmilola et al. | |
| 2014/0228039 | A1 | 8/2014 | Zhao et al. | |
| 2015/0146707 | A1* | 5/2015 | Jung | H04W 88/06 370/338 |
| 2015/0189496 | A1* | 7/2015 | Park | H04W 8/183 455/418 |
| 2015/0341946 | A1* | 11/2015 | Chong | H04W 24/08 455/450 |
| 2016/0029199 | A1* | 1/2016 | Shi | H04W 8/02 455/432.1 |

FOREIGN PATENT DOCUMENTS

| WO | WO-2015009511 A2 | 1/2015 |
|---|---|---|
| WO | WO-2016069177 A1 | 5/2016 |

* cited by examiner

RESOURCE MAPPING FOR MULTI SIM MULTI ACTIVE MULTI RAT SCENARIOS USING WLAN TRANSCEIVER SUPPORTING PARTIAL WWAN TRANSCEIVER CAPABILITIES

BACKGROUND

Field of the Disclosure

The present disclosure, for example, relates to wireless communication systems, and more particularly to resource mapping in scenarios where a single wireless device has multiple active subscriber identity modules (SIMs) accessing multiple-radio access technologies (RATs) using a wireless local area network (WLAN) transceiver to support wireless wide area network (WWAN) capabilities.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, space and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations or access points (APs), each simultaneously supporting communication for multiple communication devices, otherwise known as user equipment (UEs). UEs may contain multiple radios or transceivers, each configured to support various radio access technologies (RATs). A base station or AP may communicate with UEs on downlink channels (e.g., for transmissions from a base station to a UE) and uplink channels (e.g., for transmissions from a UE to a base station). Communication between a UE and a base station may use a wireless wide area network (WWAN), while communication between a UE and an AP may use a wireless local area network (WLAN). Wi-Fi and Bluetooth are examples of WLAN technologies that may be supported by a UE. UEs typically include different WWAN and WLAN receive (Rx) and transmit (Tx) chains. For example, a UE may have one or more Rx and Tx chains used for WWAN transmissions, and may also have separate Rx and Tx chains used for WLAN transmissions.

Although WWAN and WLAN transceivers may initially be designed for specific communication needs, with advances in technology and a need for higher data rates, the use of specific transceivers for particular RATs has begun to change. It is possible to use a WLAN transceiver whenever it is available to assist the WWAN modem. A WLAN transceiver may support a subset of WWAN transceiver capabilities, e.g., Global System for Mobile Communications (GSM) only. Furthermore, it may support only Tx, only Rx, or both Tx and Rx. Such assistance may be in support of one or more subscriber identity modules (SIMs) supported by the UE. These SIMs may be used to enable the UE to communicate on a particular network. Some UEs are dual- or multiple-SIM devices, meaning that the UE is configured to receive and use more than one SIM card. Thus, a multiple-SIM device may simultaneously operate in either an active or a standby mode on more than one network. For example, a dual-SIM, dual-active (DSDA) device is configured to actively transmit and receive on two different networks at the same time. A dual-SIM, dual standby (DSDS) device is configured to allow active transmission on one network while being in standby mode on a second network. Multiple-SIM, multiple active (MSMA) and/or multiple-SIM, multiple standby (MSMS) devices may also be used. For each additional SIM, additional Tx and/or Rx chains may be used, adding to the cost and complexity of the UE.

SUMMARY

In a UE supporting multiple RATs (including at least one WWAN transceiver and at least one WLAN transceiver) and that is operating in an MSMA scenario (including DSDA), at least a portion of the WLAN transceiver may be opportunistically used to support the operation of the WWAN transceiver. For example when a first SIM (SIM1) is in an active mode and using the WWAN transceiver for Tx and/or Rx operations, at least a portion of the WLAN transceiver may be used to support the WWAN operation of a second SIM (SIM2). The WLAN transceiver may be used to support the WWAN operations for only Tx, only Rx, or both Tx and Rx for SIM2, while SIM1 may continue to use the resources of the WWAN transceiver. Selective resource mapping—where SIM2 is sometimes supported by the WWAN transceiver and sometimes supported by the WLAN transceiver—may reduce the impact of the opportunistic WLAN usage on the regular WLAN functions handled by the WLAN transceiver.

In a first set of illustrative examples, a method for wireless communication is described. In one example, the method may include operating a wireless wide area network (WWAN) transceiver to support a first subscriber identity module (SIM) of a user equipment (UE); and selectively operating the WWAN transceiver and a wireless local area network (WLAN) transceiver to support a second SIM of the UE.

In some examples of the method, the method also includes detecting that the first SIM has switched from a first SIM standby mode to a first SIM active mode; and transferring from operating the WWAN transceiver to support the second SIM to operating the WLAN transceiver to support the second SIM. In some examples of the method, selectively operating the WWAN transceiver and the WLAN transceiver to support the second SIM further comprises: operating the WLAN transceiver to support the second SIM during a first period while the first SIM is in a first SIM active mode; and operating the WLAN transceiver to support the second SIM during a second period while the first SIM is in a first SIM standby mode and the second SIM is in a second SIM standby mode. In some examples of the method, the method also includes monitoring paging, by the WWAN transceiver, for the second SIM to detect a voice call for the second SIM; and operating the WLAN transceiver to support the voice call for the second SIM while the first SIM is in a first SIM active mode.

In some examples of the method, selectively operating the WWAN transceiver and the WLAN transceiver to support the second SIM comprises: operating the WLAN transceiver to support the second SIM during a first period while the first SIM is in a first SIM active mode. In some examples of the method, operating the WLAN transceiver to support the second SIM during the first period while the first SIM is in the first SIM active mode further comprises: processing, with a receive chain of the WLAN transceiver, a first signal received at the UE from a WWAN for the second SIM during the first period; and processing, with a transmit chain of the WWAN transceiver, a second signal to be transmitted from the UE to the WWAN for the second SIM during the first period. In some examples of the method, operating the WWAN transceiver to support the second SIM during the first period further comprises: processing, with a receive chain of the WWAN transceiver, a first signal received at the UE from a WWAN for the second SIM during the first period; and processing, with a transmit chain of the WLAN transceiver, a second signal to be transmitted from the UE to the WWAN for the second SIM during the first period. In some examples of the method selectively operating the WWAN transceiver and the WLAN transceiver to support the second SIM further comprises: operating the WWAN transceiver to support the second SIM during a second period while the first SIM is in a first SIM standby mode and the second SIM is in a second SIM standby mode. In some examples of the method selectively operating the WWAN transceiver and the WLAN transceiver to support the second SIM further comprises: operating the WWAN transceiver to support the second SIM during a second period while the first SIM is in a first SIM standby mode and the second SIM is in a second SIM active mode. In some examples of the method selectively operating the WWAN transceiver and the WLAN transceiver to support the second SIM further comprises: operating the WLAN transceiver to support the second SIM during a second period while the first SIM is in a first SIM standby mode and the second SIM is in a second SIM active mode.

In some examples of the method selectively operating the WWAN transceiver and the WLAN transceiver to support the second SIM further comprises: detecting a voice call for the second SIM; and switching from operating the WWAN transceiver to support the second SIM during a first period while the first SIM is in a first SIM standby mode to operating the WLAN transceiver to support the second SIM during a second period while the first SIM is in a first SIM active mode. In some examples of the method operating the WLAN transceiver to support the second SIM during the second period while the first SIM is in the first SIM active mode comprises: operating one of a receive chain or a transmit chain of the WLAN transceiver to support the second SIM during the second period while the first SIM is in the first SIM active mode. In some examples of the method detecting the voice call for the second SIM comprises: receiving, at the UE, a page for the voice call from a WWAN. In some examples of the method the voice call comprises a global system for mobile communications (GSM) voice call.

In some examples of the method selectively operating the WWAN transceiver and the WLAN transceiver to support the second SIM further comprises: terminating a voice call for the second SIM; and switching from operating the WLAN transceiver to support the second SIM during a first period while the first SIM is in a first SIM active mode to operating the WWAN transceiver to support the second SIM during a second period while the first SIM is in a first SIM standby mode. In some examples of the method operating the WWAN transceiver to support the second SIM during the second period while the first SIM is in the first SIM standby mode comprises: operating one of a receive chain or a transmit chain of the WWAN transceiver to support the second SIM during the second period while the first SIM is in the first SIM standby mode.

In some examples of the method selectively operating the WWAN transceiver and the WLAN transceiver to support the second SIM comprises: operating the WLAN transceiver to support a second SIM active mode, regardless of a first SIM active mode. In some examples of the method selectively operating the WWAN transceiver and the WLAN transceiver to support the second SIM further comprises: operating the WLAN transceiver to support a second SIM standby mode, regardless of the first SIM active mode. In some examples of the method selectively operating the WWAN transceiver and the WLAN transceiver to support the second SIM further comprises: operating the WWAN transceiver to support a second SIM standby mode, regardless of the first SIM active mode. In some examples of the method operating the WLAN transceiver to support the second SIM active mode, regardless of the first SIM active mode comprises: processing, with a receive chain of the WLAN transceiver, a first signal received at the UE from a WWAN for the second SIM; and processing, with a transmit chain of the WWAN transceiver, a second signal to be transmitted from the UE to the WWAN for the second SIM. In some examples of the method operating the WLAN transceiver to support the second SIM active mode, regardless of the first SIM active mode comprises: processing, with a receive chain of the WWAN transceiver, a first signal received at the UE from a WWAN for the second SIM; and processing, with a transmit chain of the WLAN transceiver, a second signal to be transmitted from the UE to the WWAN for the second SIM.

In some examples of the method, the method further includes detecting that the first SIM has switched from a first SIM standby mode to a first SIM active mode; and switching from operating the WWAN transceiver to support the second SIM to operating one of a receive chain or a transmit chain of the WLAN transceiver to support the second SIM while the first SIM is in the first SIM active mode. In some examples of the method, the method further includes detecting that the first SIM has switched from a first SIM active mode to a first SIM standby mode; and switching from operating the WLAN transceiver to support the second SIM to operating one of a receive chain or a transmit chain of the WWAN transceiver to support the second SIM while the first SIM is in the first SIM active mode. In some examples of the method, the method further includes operating the WLAN transceiver to support a WLAN function of the UE that is unrelated to support of the first SIM and that is unrelated to support of the second SIM; and switching operation of the WWAN transceiver to support the second SIM while operating the WLAN transceiver to support the WLAN function.

In a second set of illustrative examples, an apparatus for wireless communication is described. In one example, the apparatus may include means for operating a wireless wide area network (WWAN) transceiver to support a first subscriber identity module (SIM) of a user equipment (UE); and means for selectively operating the WWAN transceiver and a wireless local area network (WLAN) transceiver to support a second SIM of the UE. The apparatus may further include means for detecting that the first SIM has switched from a first SIM standby mode to a first SIM active mode; and means for transferring from operating the WWAN transceiver to support the second SIM to operating the WLAN transceiver to support the second SIM.

In a third set of illustrative examples, another apparatus for wireless communication is described. In one example, the apparatus may include a processor; memory in electronic communication with the processor; and instructions stored in the memory, the instructions being executable by the processor to: operate a wireless wide area network (WWAN) transceiver to support a first subscriber identity module (SIM) of a user equipment (UE); and selectively operate the WWAN transceiver and a wireless local area network (WLAN) transceiver to support a second SIM of the UE. The instructions stored in the memory further include instructions executable by the processor to: operate the WLAN transceiver to support the second SIM; detect that the first SIM has switched from a first SIM standby mode to a first SIM active mode; and transfer from operating the WWAN transceiver to support the second SIM to operating the WLAN transceiver to support the second SIM.

In a fourth set of illustrative examples, a non-transitory computer-readable medium storing computer-executable code for wireless communication is described. In one example, the code may be executable by a processor to operate a wireless wide area network (WWAN) transceiver to support a first subscriber identity module (SIM) of a user equipment (UE); and selectively operate the WWAN transceiver and a wireless local area network (WLAN) transceiver to support a second SIM of the UE. In some examples of the non-transitory computer-readable medium, the code may also be executable by the processor to detect that the first SIM has switched from a first SIM standby mode to a first SIM active mode; and transfer from operating the WWAN transceiver to support the second SIM to operating the WLAN transceiver to support the second SIM.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

For a UE supporting multiple SIMs, it may be desirable to operate in an MSMA scenario, including DSDA, where both a first SIM and a second SIM are active at the same time. UEs may contain multiple RATs, including at least one WWAN radio and one WLAN radio. Although WWAN radios and WLAN radios may have been initially designed for specific communications needs of the UE (e.g. 2G, 3G, or 4G wireless technology, etc., for a WWAN radio, and Wi-Fi, Bluetooth, or Zigbee, etc., for a WLAN radio), with advances in technology and a need for higher data rates, the use of WWAN and WLAN radios has started to overlap. In a UE supporting multiple SIMs that has a WWAN radio and a WLAN radio, a first SIM may be supported by the WWAN radio and its resources, while the WLAN transceiver may be used to support the WWAN modem when there is not a second WWAN available to support the second SIM as well. The WLAN radio may be used to support a subset of WLAN transceiver capabilities (e.g. supporting only GSM). The WLAN transceiver may also support the WWAN modem in different operating scenarios such as for single-SIM simultaneous GSM Long-Term Evolution (LTE) (SGLTE) or S1×LTE (e.g. page monitoring on idle RAT operations), multiple-SIM multiple-active (e.g. DSDA) scenarios using the WLAN transceiver, or multiple-RAT dual-active (MRDA) scenarios using the WLAN transceiver.

Different resource mapping scenarios may be used in accordance with various aspects of the present disclosure. For example, in a first resource mapping scenario, the WLAN transceiver is used to support WWAN SIM2 operations only when both SIM1 and SIM2 are operating in an active mode (otherwise SIM2 operations use WWAN resources). In a second exemplary resource mapping scenario, the WLAN transceiver is used to support WWAN SIM2 operations, including when SIM2 is in either an active mode or a standby mode. In this second scenario, the WLAN transceiver is used to support SIM2 operations when operating in an active mode for one of Tx, Rx, or both Tx and Rx. In a third exemplary resource mapping scenario, the WLAN transceiver is used to support WWAN SIM2 operations when SIM2 is in an active mode, regardless of whether SIM1 is in an active mode. In this third scenario, WWAN resources are used to support SIM2 operation when in a standby mode.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
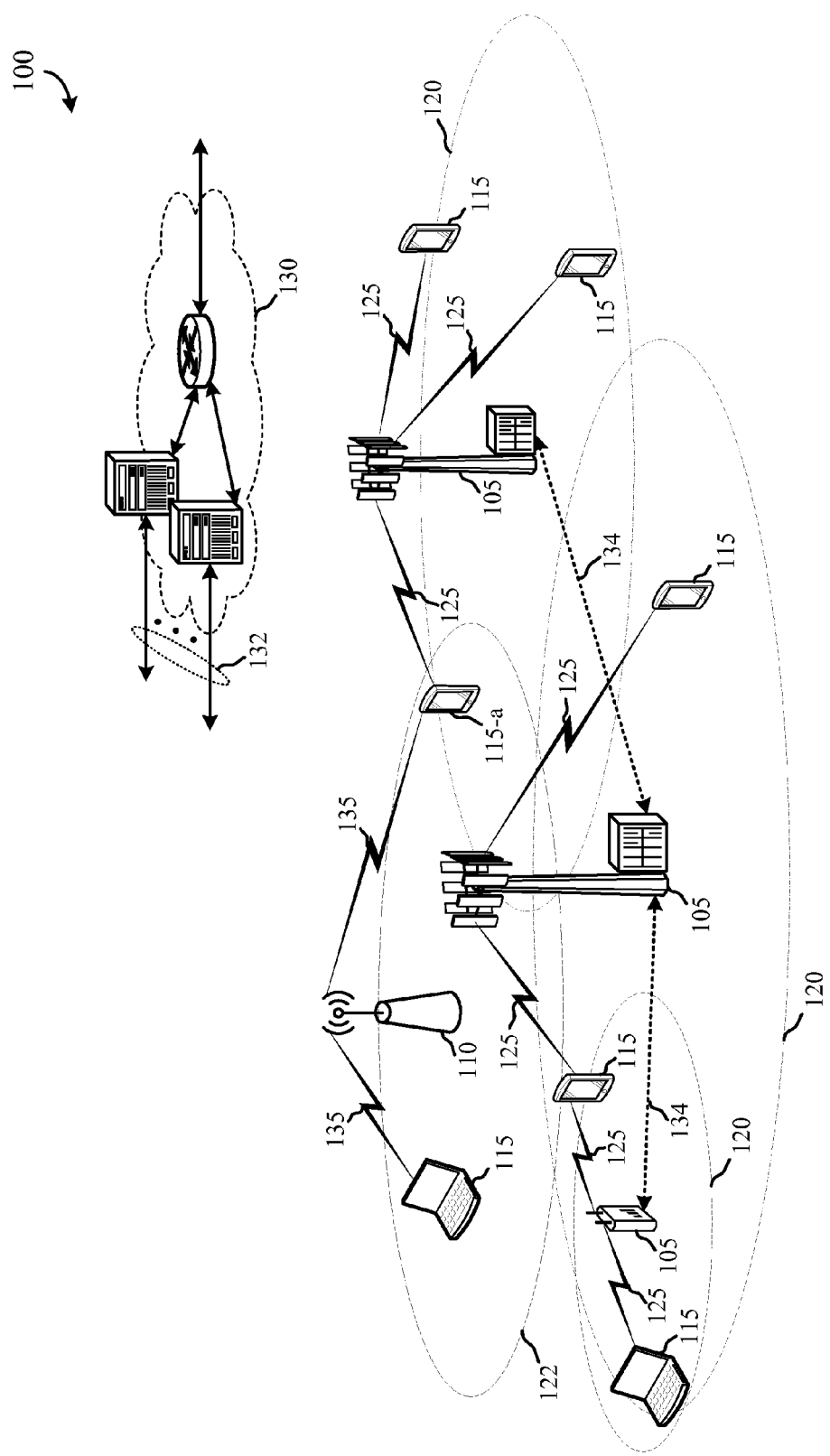
FIG. 1 shows a block diagram of a wireless communications system, in accordance with various aspects of the present disclosure.

Referring first to FIG. 1, a system diagram illustrates an example of a wireless communications system 100. The wireless communications system 100 may include base station(s) 105, AP(s) 110, and mobile devices such as UEs 115. The AP 110 may provide wireless communications via a WLAN radio access network (RAN) such as, e.g., a network implementing at least one of the IEEE 802.11 family of standards. The AP 110 may provide, for example, WLAN or other short range (e.g., Bluetooth and Zigbee) communications access to a UE 115. Each AP 110 has a geographic coverage area 122 such that UEs 115 within that area can typically communicate with the AP 110. UEs 115 may be multi-access mobile devices that communicate with the AP 110 and a base station 105 via different radio access networks. The UEs 115, such as mobile stations, personal digital assistants (PDAs), other handheld devices, netbooks, notebook computers, tablet computers, laptops, display devices (e.g., TVs, computer monitors, etc.), printers, etc., may be stationary or mobile and traverse the geographic coverage areas 122 and/or 120, the geographic coverage area of a base station 105. While only one AP 110 is illustrated, the wireless communications system 100 may include multiple APs 110. Some or all of the UEs 115 may associate and communicate with an AP 110 via a communication link 135 and/or with a base station 105 via a communication link 125.

The wireless communications system 100 may also include a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

A UE 115 can be covered by more than one AP 110 and/or base station 105 and can therefore associate with multiple APs 110 or base stations 105 at different times. For example, a single AP 110 and an associated set of UEs 115 may be referred to as a basic service set (BSS). An extended service set (ESS) is a set of connected BSSs. A distribution system (DS) (not shown) is used to connect APs 110 in an extended service set. A geographic coverage area 122 for an AP 110 may be divided into sectors making up only a portion of the geographic coverage area (not shown). The wireless communications system 100 may include APs 110 of different types (e.g., metropolitan area, home network, etc.), with varying sizes of coverage areas and overlapping coverage areas for different technologies. Although not shown, other wireless devices can communicate with the AP 110.

The base stations 105 may wirelessly communicate with the UEs 115 via base station antennas. Each of the base station 105 sites may provide communication coverage for a respective geographic coverage area 120. In some examples, base stations 105 may be referred to as a base transceiver station, a radio base station, an AP, a radio transceiver, a NodeB, eNodeB (eNB), Home NodeB, a Home eNodeB, or some other suitable terminology. The geographic coverage area 120 for a base station 105 may be divided into sectors making up only a portion of the coverage area (not shown). The wireless communications system 100 may include base stations 105 of different types (e.g., macro and/or small cell base stations). There may be overlapping geographic coverage areas 120/122 for different technologies.

In some examples, the wireless communications system 100 includes portions of an LTE/LTE-Advanced (LTE-A) network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, APs, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include at least one carrier, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. Similarly, communication links 135, also shown in wireless communications system 100, may include UL transmissions from a UE 115 to an AP 110, and/or DL transmissions from an AP 110 to a UE 115.

In some embodiments of the system 100, base stations 105, APs 110, and/or UEs 115 may include multiple antennas for employing antenna diversity schemes to improve communication quality and reliability between base stations 105, APs 110, and UEs 115. Additionally or alternatively, base stations 105, APs 110, and/or UEs 115 may employ multiple-input, multiple-output (MIMO) techniques that may take advantage of multi-path environments to transmit multiple spatial layers carrying the same or different coded data.

System 100 includes a UE 115-*a* which is in communication with both a base station 105 and an AP 110. As an example, UE 115-*a* may communicate with the AP 110 using Wi-Fi or other WLAN communications, while the UE 115-*a* may communicate with the base stations 105 using LTE, GSM, or other WWAN communications. The communications may be at the same time. As an example, the UE 115-*a* may be a DSDA or MSMA device having a first SIM (SIM1) and a second SIM (SIM2) and may communicate with one base station 105 using LTE communications for SIM1, another base station 105 using GSM communications for SIM2, and an AP 110 using Wi-Fi communications. As another example, the UE 115-*a* may communicate with one base station 105 using LTE communications for SIM1, the same base station 105 using GSM communications for SIM2, and an AP 110 using Wi-Fi communications.

The UE 115-a may include a single WWAN Rx and Tx chain that may be shared between multiple WWAN communications. For example, a first WWAN communication (such as an LTE communication) may utilize the WWAN Rx chain during a first time period, and a second WWAN communication (such as a GSM communication) may utilize the WWAN Rx chain during a second time period. When a WWAN communication facilitated by SIM1 is utilizing the WWAN Rx or Tx chains, the WWAN Rx or Tx chains may be unavailable for use for different WWAN communications facilitated by SIM2. Therefore, while the multiple WWAN communications are occurring, the UE 115-a may utilize a portion of a WLAN module in the UE to offload a portion of the processing for one of the WWAN communications from the WWAN module to the WLAN module. In this way, the availability of the single WWAN Rx and Tx chains may be increased. However, the WLAN module in the UE 115-a may also often be in communication with an AP 110 using Wi-Fi, Bluetooth, or other WLAN communications. Overuse of the WLAN module in the UE 115-a to offload WWAN communication may degrade UE performance. For example, exclusive use of the WLAN module to support GSM voice calls for SIM2 may result in poor GSM voice call quality during WLAN communication while the WLAN module is shared, and WLAN throughput for Wi-Fi may be adversely affected by the GSM voice call. If the WWAN module is available to support GSM voice call for SIM2, then the GSM voice call may be switched to the WWAN module when that resource becomes available so that the WLAN module is more available to support WLAN communications. WWAN and WLAN Rx and Tx chains may also be treated separately, for example so that the Rx chain of the WWAN module and the Tx chain of the WLAN module may support GSM voice calls for SIM2. Therefore, resource mappings, including separate treatment of Rx and Tx chains, may opportunistically use the WLAN module in support of the WWAN module.

Figure 2A:
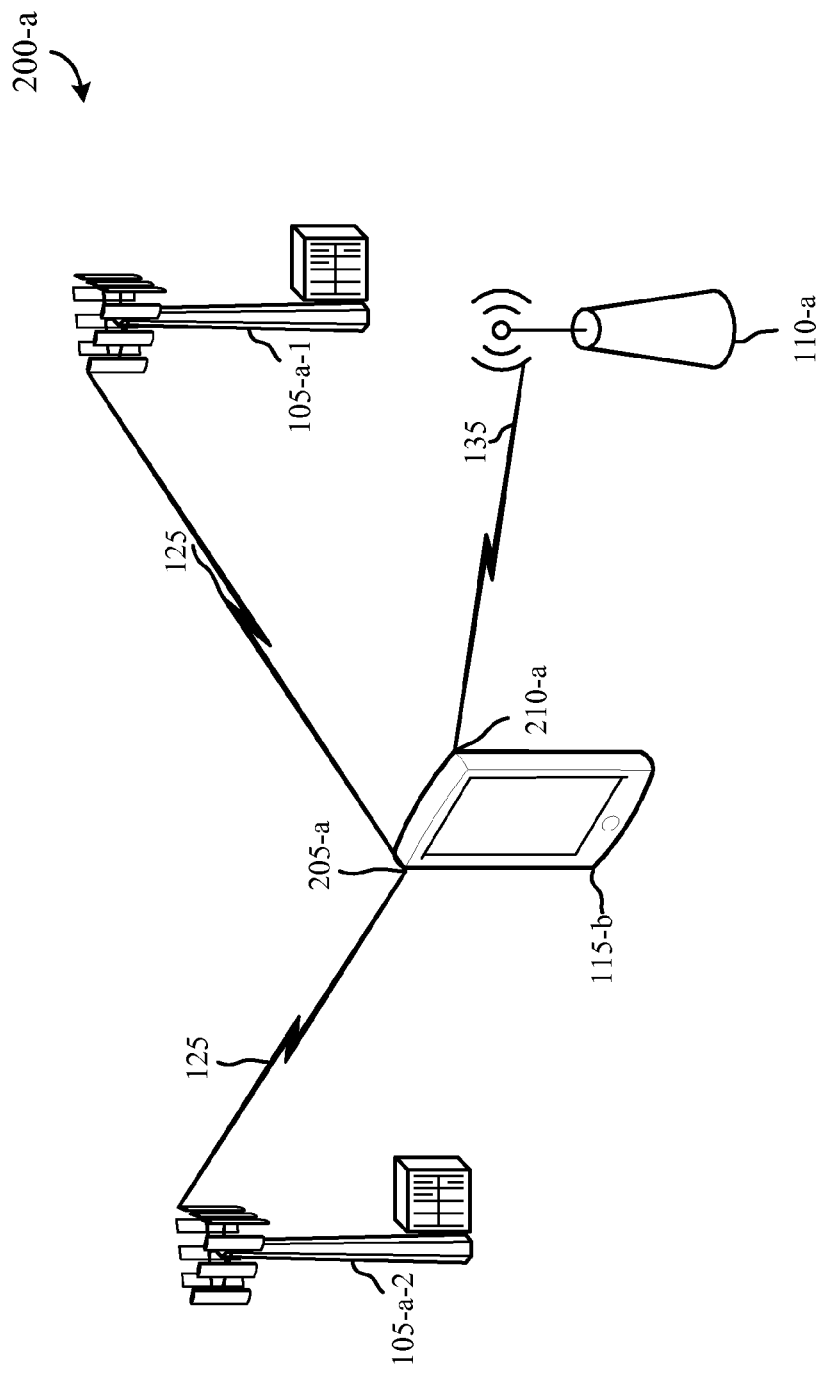
FIG. 2A illustrates a system diagram that shows an example of a wireless communications system, in accordance with various aspects of the present disclosure.

FIG. 2A illustrates a system diagram that shows an example of a wireless communications system 200-a. The wireless communications system 200-a may include base stations 105-a-1, 105-a-2, AP 110-a and UE 115-b. The UE 115-b may be an example of UE 115-a in system 100 of FIG. 1 and may be engaged in both WWAN and WLAN communications. The base stations 105-a-1, 105-a-2 may be examples of base stations 105 included in system 100 of FIG. 1, and the AP 110-a may be an example of the AP 110 in system 100 of FIG. 1.

In system 200-a, the UE 115-b may include at least two different sets of antennas, WWAN antennas 205-a and WLAN antennas 210-a. For example, WWAN antennas 205-a may be a WWAN antenna associated with a WWAN module. Using the WWAN antennas 205-a, the UE 115-b may engage in WWAN communications with base station 105-a-1 and base station 105-a-2 via communication links 125. The WWAN antennas 205-a and associated WWAN module may include both Rx and Tx chains used during WWAN communications. The WWAN antennas 205-a may include one or more diversity WWAN antennas for WWAN communications with base station 105-a-1 and/or base station 105-a-2, where each WWAN communication supports a different SIM. The one or more diversity WWAN antennas 205-a may also be used for WWAN communications with base station 105-a-1 and/or base station 105-a-2, where the WWAN communication supports one SIM in a carrier aggregation (CA) or multi-carrier mode.

In system 200-a, the UE 115-b may use the WLAN antennas 210-a to communicate with the AP 110-a (via communication link 135). The communications with the AP 110-a may be Wi-Fi or other WLAN communications. As described in greater detail below, both the WWAN communications and the WLAN communications may share portions of the Tx and Rx chains of a WLAN module associated with the WLAN antennas 210-a. For example, while a WWAN communication from base station 105-a-1 may be received by the WWAN antennas 205, the WWAN communication may be processed by a portion of the WLAN Rx chain while the WWAN Rx chain is processing a different WWAN communication from base station 105-a-2. Similarly, a WWAN communication may be processed by a portion of the WLAN Tx chain that may be transmitted to base station 105-a-1 using WWAN antennas 205-a while the WWAN Tx chain is processing a different WWAN communication that may be transmitted to base station 105-a-2 using WWAN antennas 205-a. Each of the WWAN communications may support different SIMs included in the UE 115-b.

Figure 2B:
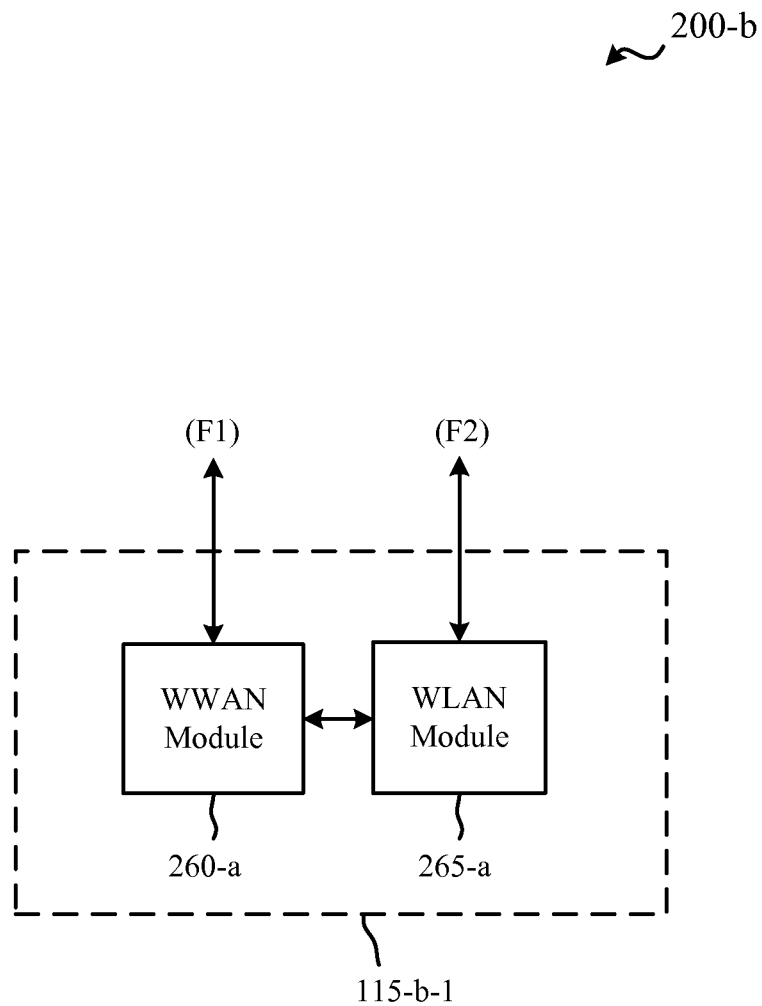
FIG. 2B shows a system for use in wireless communications, in accordance with various aspects of the present disclosure.

FIG. 2B shows a system 200-b for use in wireless communications, in accordance with various aspects of the present disclosure. The UE 115-b-1 may include a WWAN module 260-a and a WLAN module 265-a. The WWAN module 260-a may facilitate communications over a WWAN. The WWAN module 260-a may support communications within a first frequency bandwidth F1 or first RAT. The WLAN module 265-a may facilitate communications over a WLAN. The WLAN module 265-a may support communications within a second frequency bandwidth F2 or second RAT. In some examples the first frequency bandwidth F1 and the second frequency bandwidth F2 may be adjacent bandwidths. In these examples, the UE 115-b-1 may send and/or receive WWAN communications using components of the WLAN module 265-a.

Figure 3A:
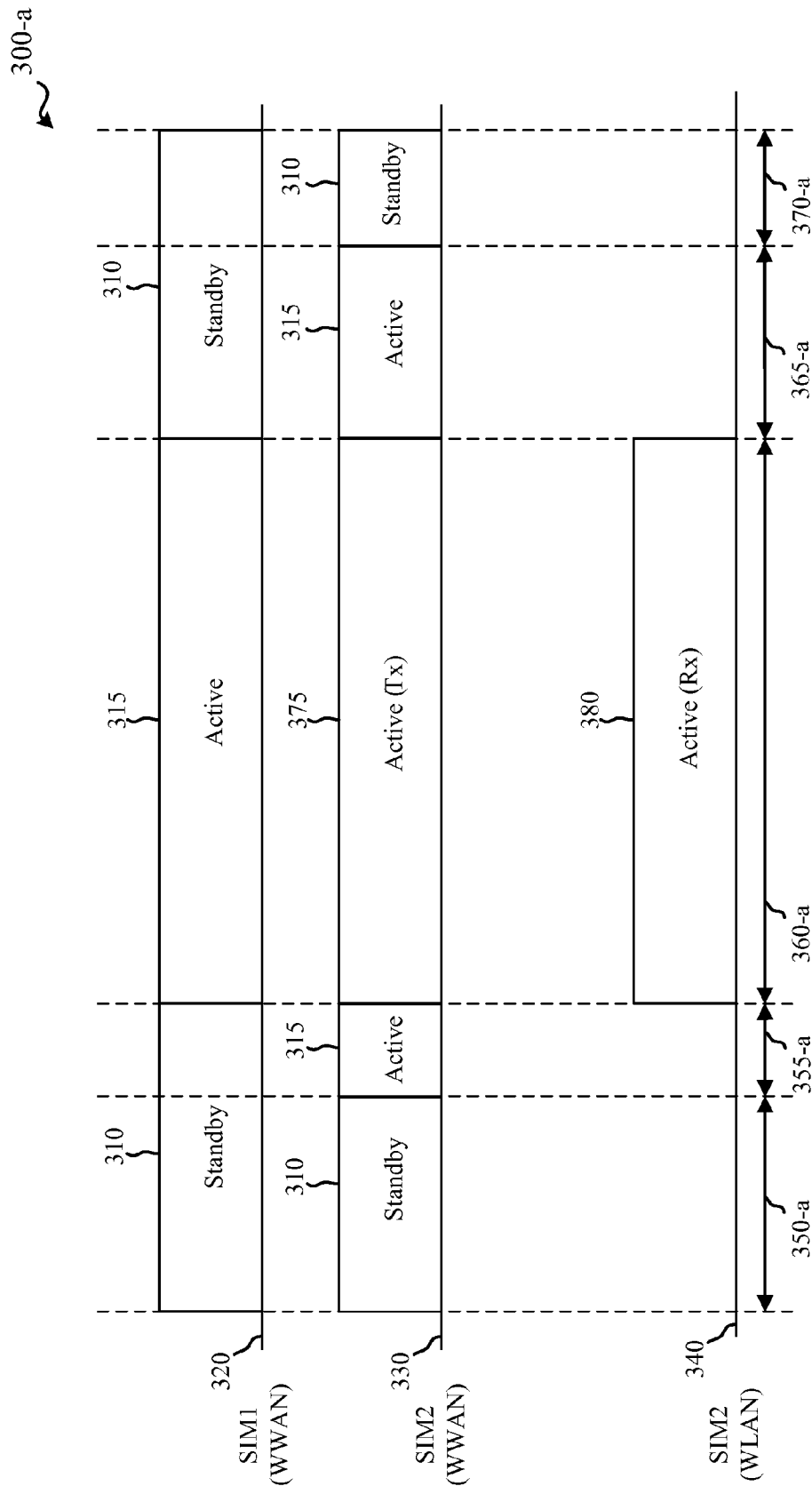
FIG. 3A illustrates a first example timing diagram for operation of a multiple-SIM UE using a first resource mapping for wireless communications, in accordance with various aspects of the present disclosure.

FIG. 3A illustrates a first example timing diagram 300-a for operation of a multiple-SIM UE 115 operating according to a first resource mapping for wireless communications, in accordance with various aspects of the present disclosure. UE 115 may be an example of the UEs 115 of FIGS. 1 and/or 2 that support at least two SIMs: SIM1 and SIM2. SIM1 may be associated with a first subscription for communicating over a first network (e.g., via the first base station 105-a-1), and SIM2 may be associated with a second subscription for communicating over a second network (e.g., via the second base station 105-a-2). By way of example, the first subscription may be a voice or data LTE/LTE-A, Wideband Code Division Multiple Access (WCDMA), Time Division Synchronous Code Division Multiple Access (TD-SCDMA), 1× Evolution-Data Only (1×EV-DO), GSM, or Wi-Fi subscription, and the second subscription may be a GSM voice subscription, or vice versa. The first and second subscriptions may be with the same or different providers. Each of SIM1 and SIM2 may be operating in an active mode or operating in a standby mode, or neither, at a particular time.

According to the first resource mapping, the WWAN transceiver may operate to support SIM1 when SIM1 is operating in either its standby mode or active mode, regardless of the operating mode of SIM2. For SIM2, the WWAN transceiver may operate to support SIM2 when SIM2 is operating in its standby mode, regardless of whether SIM1 is in a standby mode or an active mode. The WWAN transceiver may also operate to support SIM2 when SIM2 is operating in its active mode, if SIM1 is operating in a standby mode. However, if SIM1 is operating in its active mode, the Tx chain of the WWAN transceiver may operate to support transmit for SIM2 while SIM2 is in its active mode, but the Rx chain of the WLAN transceiver (rather than of the WWAN transceiver) may operate to support receive for SIM2. This is desirable for various reasons. For example, the WWAN transceiver may have the capability of supporting simultaneous Tx operation of SIM1 and SIM2, but may be only capable of one Rx operation. In another example, simultaneous Rx operation of SIM1 and SIM2 by the WWAN transceiver may create undesired performance degradation due to mutual coupling, etc.

Turning back to FIG. 3A, timing axis 320 represents the mode state for SIM1 with respect to the WWAN transceiver over time (time period 350-a precedes time period 355-a, which in turn precedes time period 360-a, etc.), such that during a time period 350-a, SIM1 is operating in a standby mode 310 using the resources of the WWAN transceiver of UE 115. Timing axis 330 represents the mode state for SIM2 with respect to the WWAN transceiver over the same time periods, and timing axis 340 represents the mode state for SIM2 with respect to the WLAN transceiver, once again over the same time periods. FIG. 3A illustrates that during time period 350-a, SIM2 is also operating in a standby mode 310 using the resources of the WWAN transceiver of UE 115, and is not using the resources of the WLAN transceiver.

Beginning at time period 355-a, SIM2 is operating in an active mode 315. In the particular example where SIM2 is associated with a GSM voice subscription, SIM2 in an active mode 315 may represent that a GSM voice call has been initiated for SIM2 and is currently active. During time period 355-a, SIM1 is in a standby mode supported by the WWAN transceiver, so that the active mode for SIM2 may also be supported by the WWAN transceiver, and is still not using the resources of the WLAN transceiver.

Beginning at time period 360-a, in addition to SIM2 being in an active mode, SIM1 is now also in an active mode 315. In the example where SIM1 is associated with a voice or data LTE subscription, SIM1 in active mode 315 may represent that an LTE voice call has been initiated for SIM1 and is currently active. Once SIM1 goes into an active mode 315, the WWAN transceiver continues to support transmit for SIM2 in the active mode, illustrated as active (Tx) 375 on timing axis 330, but support for receive for SIM2 in the active mode is transferred from the WWAN transceiver to the receive chain of the WLAN transceiver, which is illustrated by active (Rx) 380 on timing axis 340 during time period 360-a.

During time period 365-a, SIM1 has gone back into a standby mode, illustrated by standby mode 310 on timing axis 320. In the example above where SIM1 is associated with a voice or data LTE subscription, SIM1 going from active mode 315 during time period 360-a to standby mode 310 during time period 365-a may represent that the LTE voice call was terminated. Once SIM1 goes into standby mode 310, support for receive for SIM2 in the active mode is transferred back to the WWAN transceiver, which is illustrated by active mode 315 on timing axis 330 during time period 350-a, and no WLAN transceiver support for SIM2 illustrated on timing axis 340.

During time period 370-a, SIM2 has gone back into standby, which mode is supported by the WWAN transceiver as illustrated by standby mode 310 on timing axis 330. SIM1 is also supported by the WWAN transceiver in its standby mode during time period 370-a, as illustrated by standby mode 310 on timing axis 320.

Figure 3B:
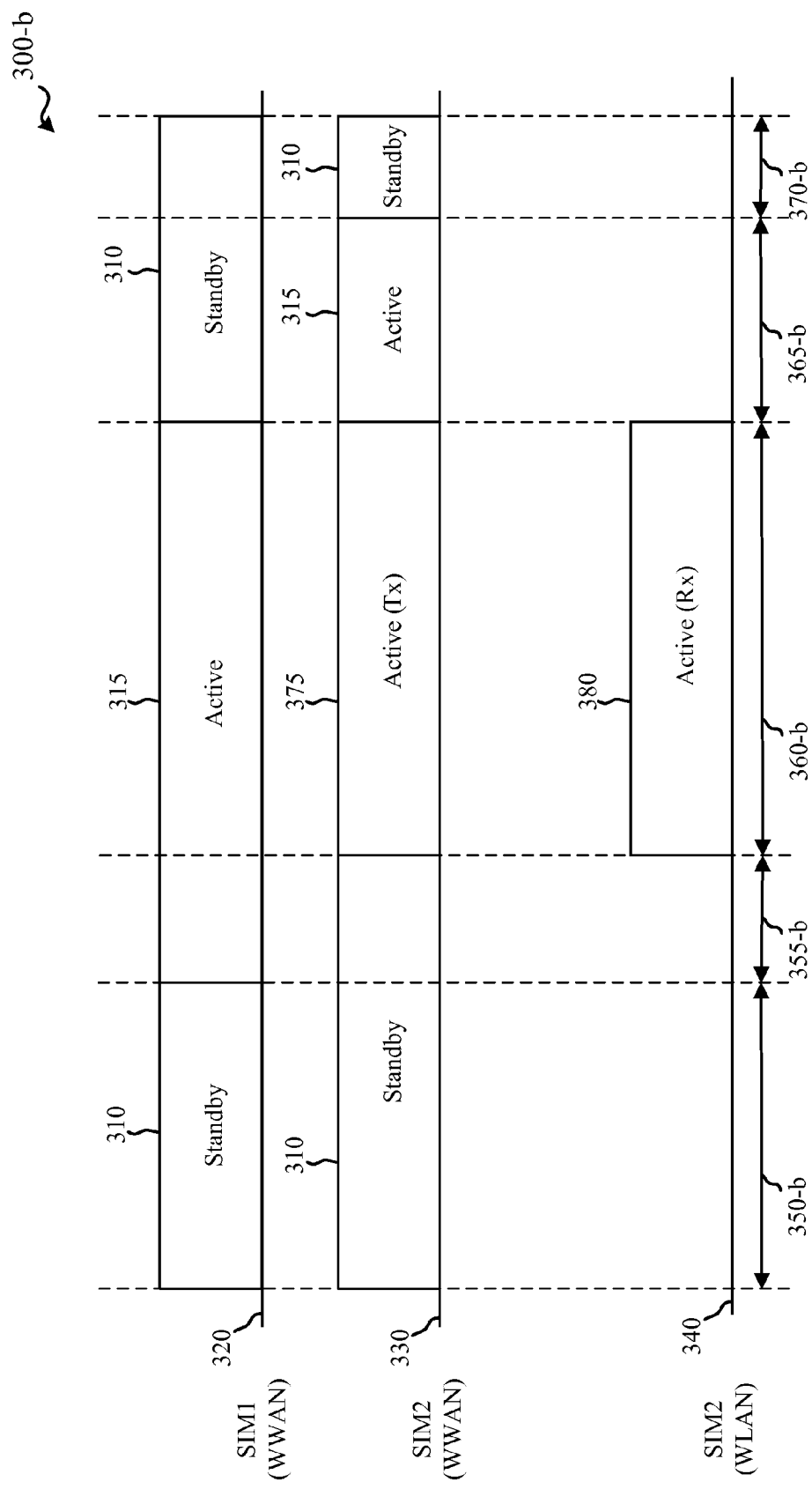
FIG. 3B illustrates a second example timing diagram for operation of a multiple-SIM UE using a first resource mapping for wireless communications, in accordance with various aspects of the present disclosure.

FIG. 3B illustrates a second example timing diagram 300-b for operation of a multiple-SIM UE 115 using the first resource mapping for wireless communications, in accordance with various aspects of the present disclosure. FIG. 3A illustrated SIM2 going into an active mode prior to SIM going into an active mode, for example because SIM2 began a voice call prior to SIM1 beginning a voice call. In FIG. 3B, SIM1 goes into an active mode supported by the WWAN transceiver, which is illustrated by active mode 315 during time period 355-b for the timing axis 320, while SIM2 is still in a standby mode supported by the WWAN transceiver which is illustrated by standby mode 310 during time period 355-b for the timing axis 330. Now, when SIM2 goes into an active mode beginning with time period 360-b, transmit for SIM2 is supported by the WWAN transceiver from the outset and receive for SIM2 is also supported by the WLAN transceiver from the outset, as shown with active (Tx) 375 on timing axis 330 and active (Rx) on timing axis 340, respectively, during time period 360-b.

In this second example timing diagram, after SIM1 returns to a standby mode during time period 365-b, SIM2 remains in an active mode. However, responsibility for the support of receive for SIM2 is transferred from the WLAN transceiver supporting an active (Rx) 380 during time period 360-b, illustrated on timing axis 340, back to the WWAN transceiver during time period 365-b, such that the WWAN transceiver supports both transmit and receive for SIM2 during time period 365-b. The WWAN transceiver continues to support SIM2 in its standby mode, once SIM2 returns to a standby mode during time period 370-b, shown on timing axis 330.

Figure 3C:
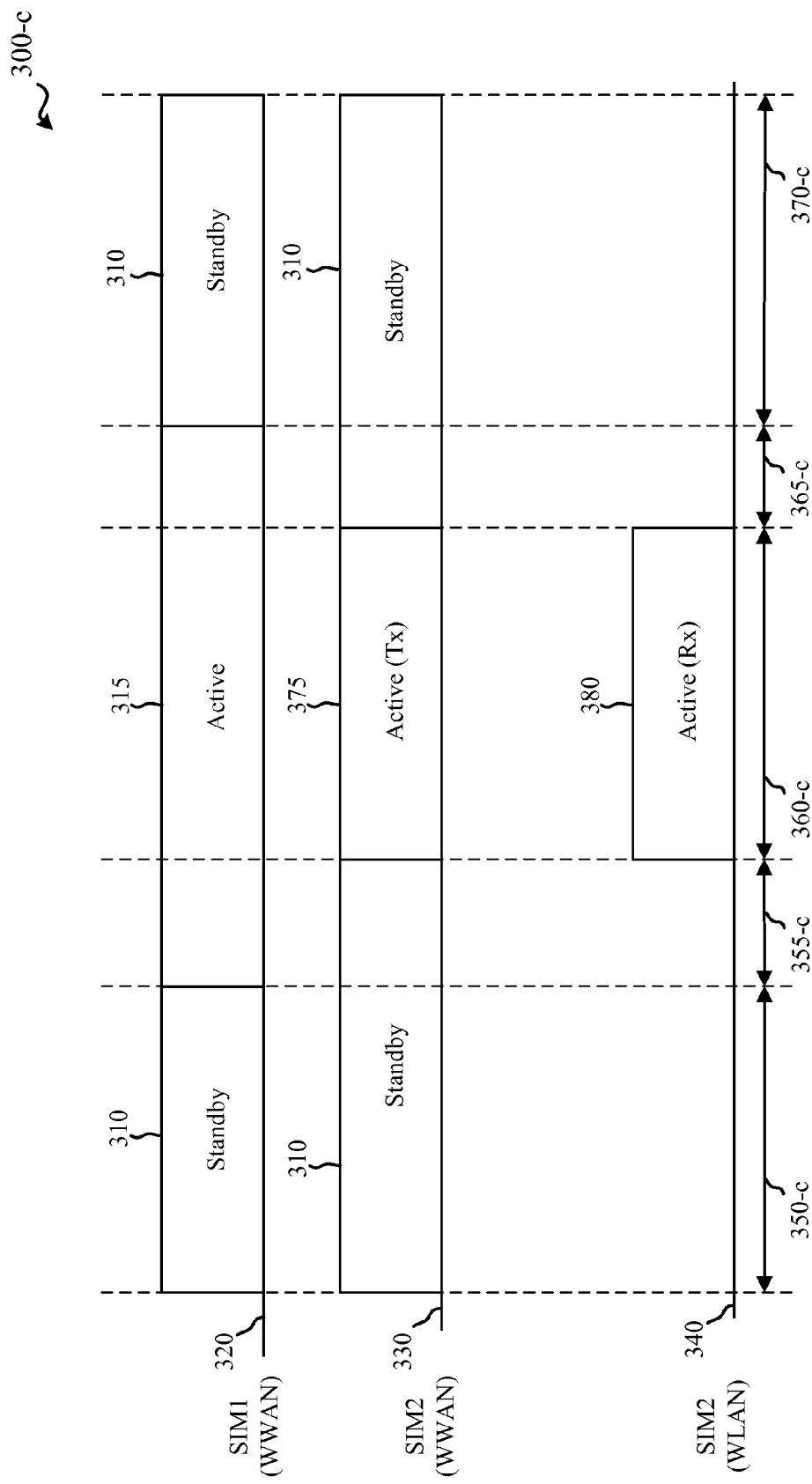
FIG. 3C illustrates a third example timing diagram for operation of a multiple-SIM UE using a first resource mapping for wireless communications, in accordance with various aspects of the present disclosure.

FIG. 3C illustrates a third example timing diagram 300-c for operation of a multiple-SIM UE 115 using the first resource mapping for wireless communications, in accordance with various aspects of the present disclosure. FIG. 3B illustrated SIM2 going back into a standby mode after SIM1 had already returned to a standby mode, for example because SIM1 had terminated an ongoing LTE voice call supported by the WWAN transceiver while a SIM2 continued with a GSM voice call supported both by the WWAN transceiver (for transmit) and the WLAN transceiver (for receive). In FIG. 3C, both SIM1 and SIM2 are in an active mode during time period 360-c. The WWAN transceiver is operating to support both transmit and receive for SIM1, illustrated by active mode 315 on timing axis 320, and transmit for SIM2, illustrated by the active (Tx) 375 on timing axis 330, while the WLAN transceiver is operating to support receive for SIM2, illustrated by active (Rx) 380 on timing axis 340. By time period 365-c, SIM2 has returned to a standby mode, which the WLAN transceiver is operating to support as shown on timing axis 330, while SIM1 continues to operate in an active mode 315 shown on timing axis 320. In this third example, SIM2 transitioned to an active mode, then back to a standby mode, entirely within the time SIM1 had been in an active mode 315 during time period 355-c, time period 360-c, and time period 365-c.

Figure 3D:
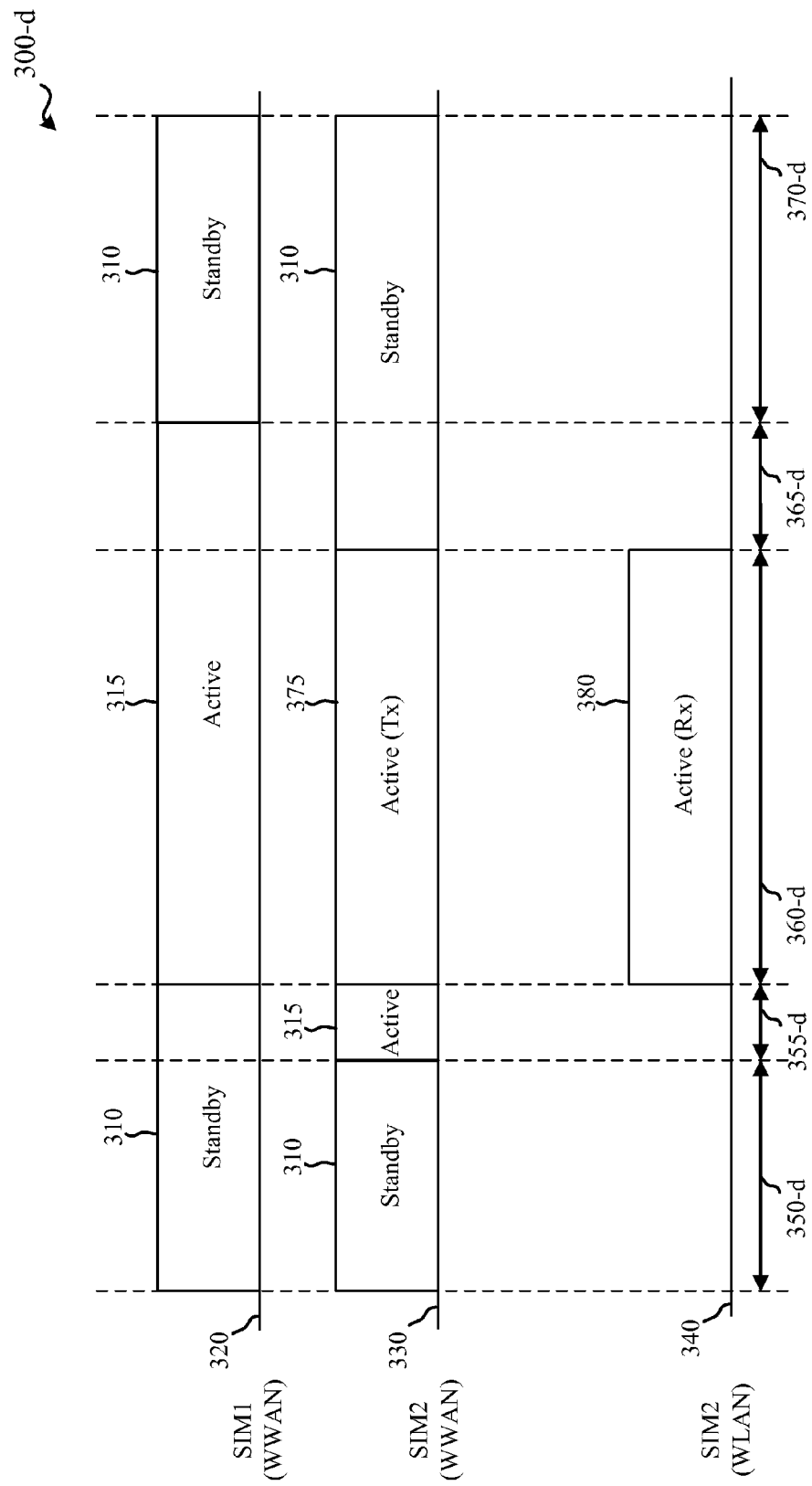
FIG. 3D illustrates a fourth example timing diagram for operation of a multiple-SIM UE using a first resource mapping for wireless communications, in accordance with various aspects of the present disclosure.

FIG. 3D illustrates a fourth example timing diagram 300-d for operation of a multiple-SIM UE 115 using the first resource mapping for wireless communications, in accordance with various aspects of the present disclosure. In this fourth example, SIM2 transitions to an active mode 315 during time period 355-d as shown on timing axis 330 prior to when SIM1 transitions to an active mode 315 during time period 360-d and time period 365-d as shown on timing axis 320. Initially, during time period 355-d, the WWAN transceiver operates to support the active mode 315 of SIM2. However, upon detecting, for example by a resource mapping controller, that SIM 1 has also transitioned to an active mode, during time period 360-d, support for receive for the active mode is transferred from the WWAN transceiver to the WLAN transceiver, as shown by active (Rx) 380 on timing axis 340. The WWAN transceiver continues to operate to support transmit for the active mode of SIM2, as shown by active (Tx) 375 on timing axis 330. Once the active mode for SIM2 terminates, SIM2 returns to a standby mode 310 shown on timing axis 330 supported by the WWAN transceiver beginning with time period 365-*d* and continuing during time period 370-*d* when SIM1 also returns to a standby mode 310, shown on timing axis 320.

Each of FIGS. 3A through 3D illustrate timing diagrams for operation of a multiple-SIM UE 115 using the first resource mapping where the WLAN transceiver operates to support receive for SIM2, illustrated as active (Rx) 380 during time period 360, when the WWAN transceiver is operating to support both SIM1 in an active mode 315 and transmit for SIM2 in an active mode, active (Tx) 375. According to other examples, WLAN and WWAN transceiver support for receive and transmit for SIM2 may be switched, such that the WLAN transceiver may operate to support transmit for SIM2 (active (Tx) 375) during a time period when the WWAN transceiver may operate to support both SIM1 in an active mode, active (Tx) 315, and receive for SIM2 in an active mode, active (Rx) 380.

Figure 4A:
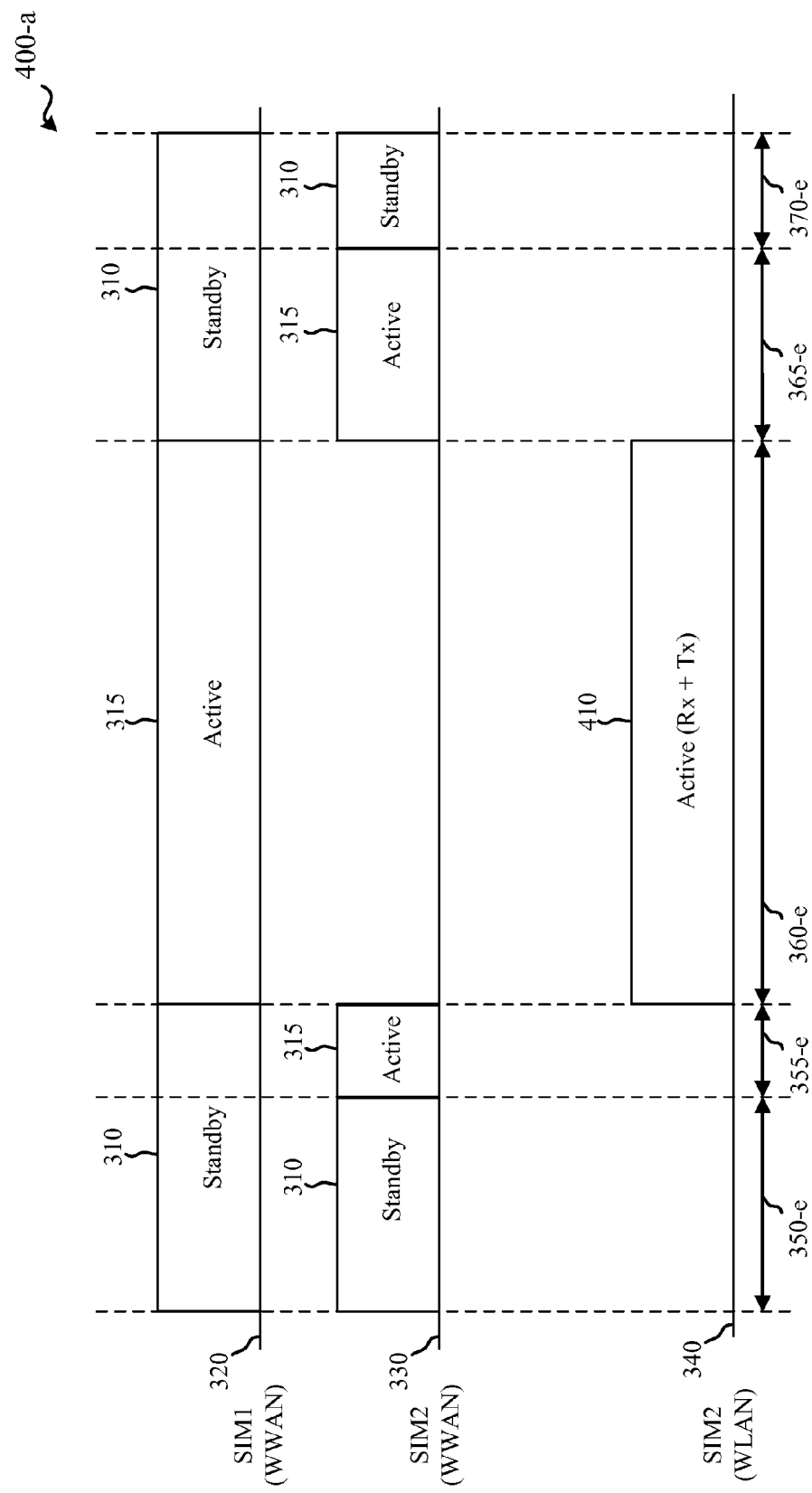
FIG. 4A illustrates a first example timing diagram for operation of a multiple-SIM UE using a variation of the first resource mapping for wireless communications, in accordance with various aspects of the present disclosure.

FIG. 4A illustrates a first example timing diagram 400-*a* for operation of a multiple-SIM UE 115 using a variation of the first resource mapping for wireless communications, in accordance with various aspects of the present disclosure. In this variation of the first resource mapping, the WLAN transceiver may operate to support both transmit and receive for SIM2, shown as active (Rx+Tx) 410 during time period 360-*e* on timing axis 340, when the WWAN transceiver is operating to support SIM1 in an active mode 315, shown during time period 360-*e* on timing axis 320. SIM2 is supported by the WWAN transceiver during a standby mode 310 during time period 350-*e*, shown on timing axis 330, when SIM1 is also in a standby mode 310 as shown on timing axis 320. When SIM2 becomes active during time period 355-*e*, the WWAN transceiver supports the active mode 315 shown on timing axis 330, while the WWAN transceiver continues to support the standby mode 310 for SIM1 as shown on timing axis 320. In the particular example where SIM2 is associated with a GSM voice subscription, SIM2 in an active mode 315 may represent that a GSM voice call has been initiated for SIM2 and is currently active.

Beginning at time period 360-*e*, in addition to SIM2 being in an active mode, SIM1 is now also in an active mode 315. In the example where SIM1 is associated with a voice or data LTE subscription, SIM1 in active mode 315 may represent that an LTE voice call has been initiated for SIM1 and is now currently active. Once SIM1 goes into an active mode 315, the WWAN transceiver no longer supports any of transmit or receive for SIM2 in its active mode 315, illustrated on timing axis 330 during time period 360-*e*. Instead, support for both receive and transmit for SIM2 in the active mode is transferred from the WWAN transceiver to the WLAN transceiver, which is illustrated by active (Rx+Tx) 410 on timing axis 340 during time period 360-*e*.

Once SIM1 is no longer in an active mode, for example when an LTE voice call has been terminated at the end of time period 360-*e*, SIM1 returns to a standby mode 310 supported by the WWAN transceiver, shown on timing axis 320 during time period 365-*e*. A resource mapping controller may detect that SIM1 is now back in a standby mode, and transfer support for both transmit and receive for SIM2 back to the WWAN transceiver, shown as active mode 315 on timing axis 330 during time period 365-*e*. Once SIM2 is no longer in an active mode, it returns to a standby mode 310 during time period 370-*e* supported by the WWAN transceiver as shown on timing axis 330. In the particular example where SIM2 is associated with a GSM voice subscription and the SIM2 active mode represents a GSM voice call, support for the GSM voice call for SIM2 starts with the WWAN transceiver during time period 355-*e*, is transferred to the WLAN transceiver for support during time period 360-*e*, and then is transferred back to the WLAN transceiver for support during time period 365-*e*, triggered by detection of a change in mode state of SIM1 between an active mode and a standby mode.

Figure 4B:
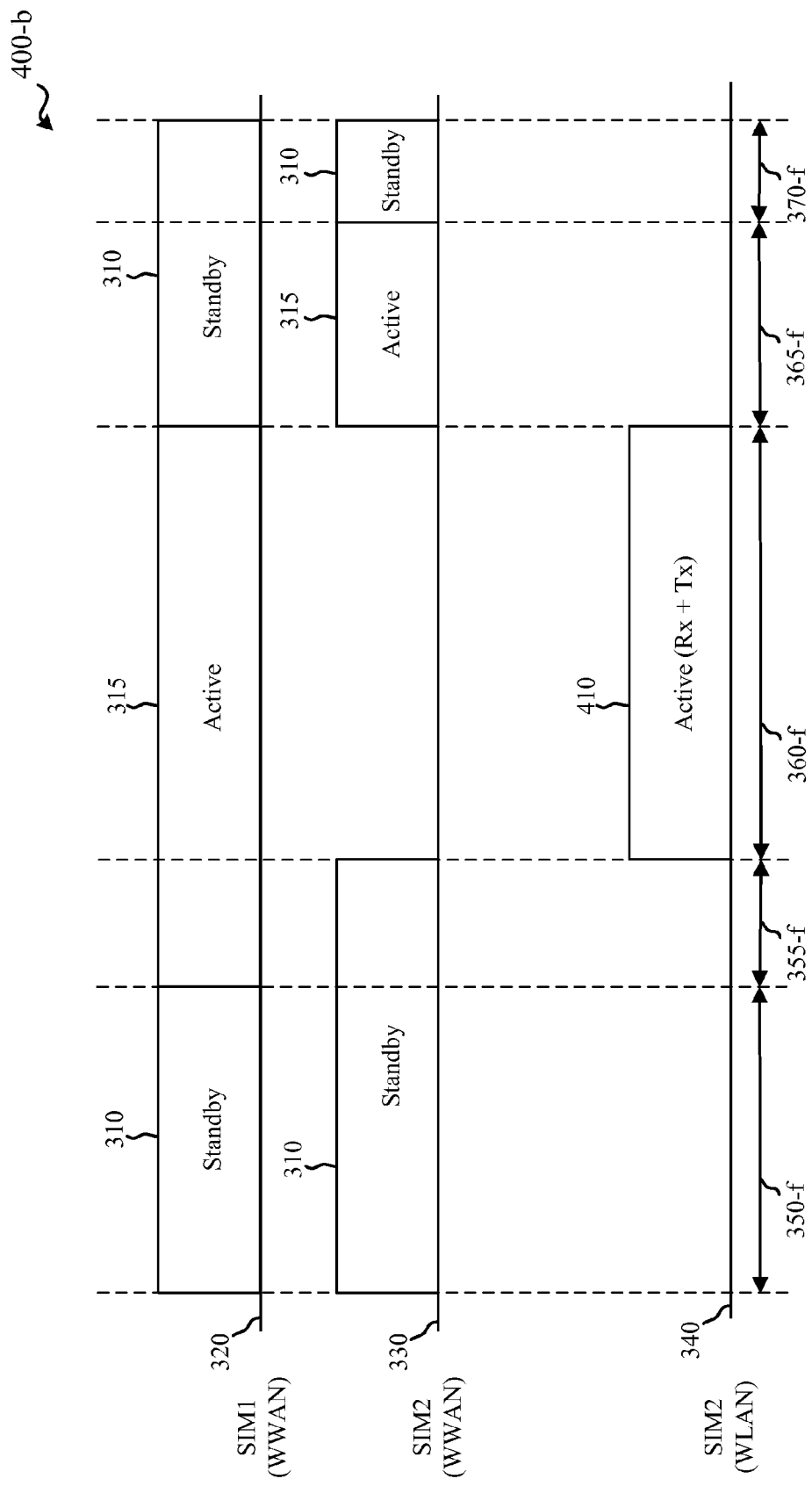
FIG. 4B illustrates a second example timing diagram for operation of a multiple-SIM UE using a variation of the first resource mapping for wireless communications, in accordance with various aspects of the present disclosure.

FIG. 4B illustrates a second example timing diagram 400-*b* for operation of a multiple-SIM UE 115 using the variation of the first resource mapping for wireless communications, in accordance with various aspects of the present disclosure. Like the example timing diagram 400-*a* of FIG. 4A, the timing diagram 400-*b* of FIG. 4B illustrates that the WLAN transceiver supports both transmit and receive for SIM2, shown as active (Rx+Tx) during time period 360-*f* on timing axis 340, while SIM 1 is in an active mode 315 supported by the WWAN transceiver, shown during time period 355-*f* and time period 360-*f*. Because SIM1 is in an active mode 315 supported by the WWAN transceiver during time period 355-*f* as shown on timing axis 320, when SIM2 goes into an active mode beginning with time period 360-*f*, both transmit and receive for SIM2 are supported by the WLAN transceiver from the outset, as shown with active (Rx+Tx) 410 on timing axis 340. In this second example timing diagram, after SIM1 returns to a standby mode 310 during time period 365-*f*, SIM2 remains in an active mode. However, responsibility for the support of both transmit and receive for SIM2 is transferred from the WLAN transceiver back to the WWAN transceiver during time period 365-*f*, such that the WWAN transceiver supports both transmit and receive for SIM2 during time period 365-*f*. The WWAN transceiver continues to support SIM2 in its standby mode, once SIM2 returns to a standby mode during time period 370-*b*, shown as standby mode 310 on timing axis 330.

Figure 4C:
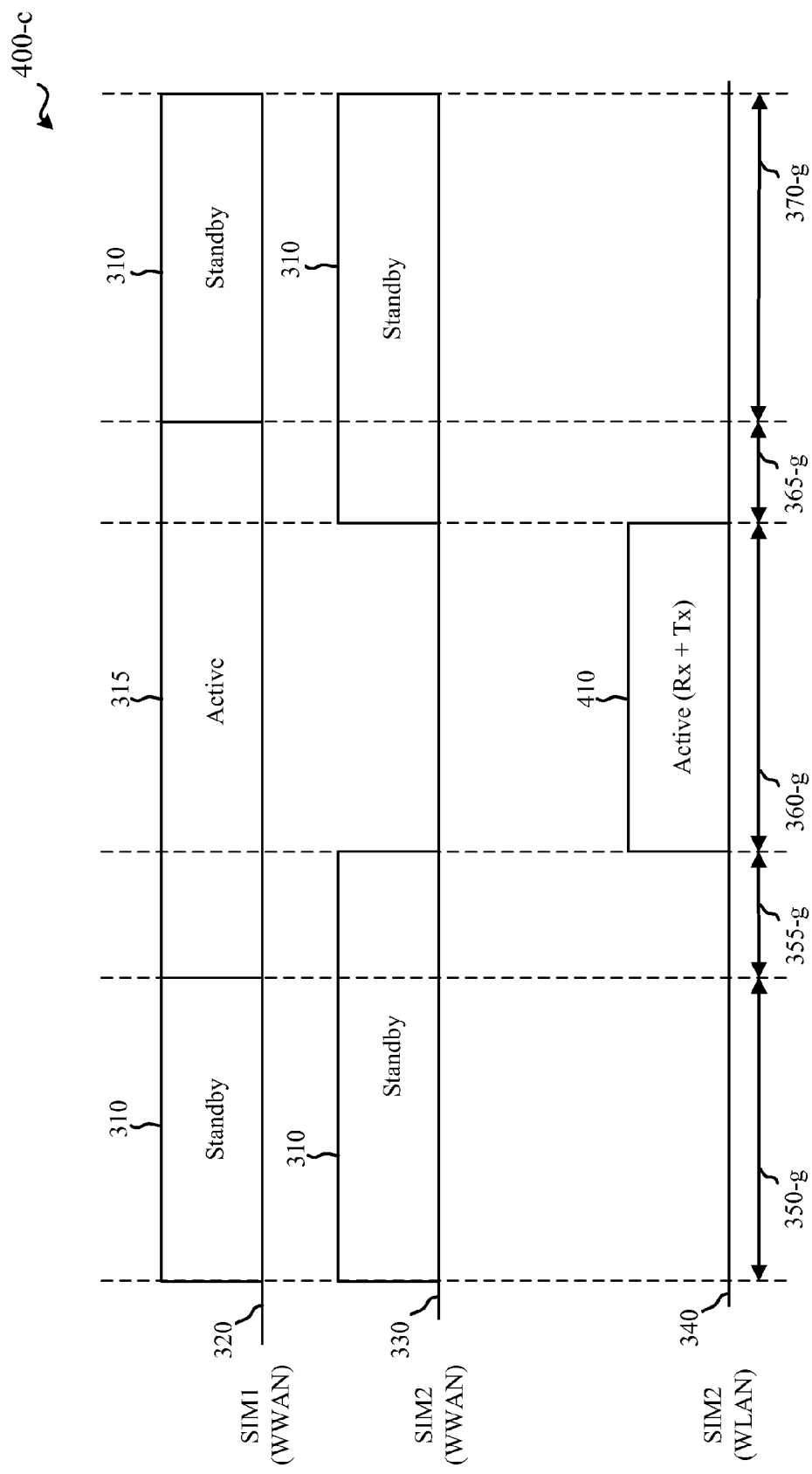
FIG. 4C illustrates a third example timing diagram for operation of a multiple-SIM UE using a variation of the first resource mapping for wireless communications, in accordance with various aspects of the present disclosure.

FIG. 4C illustrates a third example timing diagram 400-*c* for operation of a multiple-SIM UE 115 using the variation of the first resource mapping for wireless communications, in accordance with various aspects of the present disclosure. FIG. 4B illustrated SIM2 going back into a standby mode after SIM1 had already returned to a standby mode, for example because SIM1 had terminated an ongoing LTE voice call supported by the WWAN transceiver while a SIM2 continued with a GSM voice call supported both by the WWAN transceiver (for transmit) and the WLAN transceiver (for receive). In FIG. 4C, both SIM1 and SIM2 are in an active mode during time period 360-*g*. The WWAN transceiver is operating to support both transmit and receive for SIM1, illustrated by active mode 315 on timing axis 320, while the WLAN transceiver is operating to support both transmit and receive for SIM2, illustrated by active (Rx+Tx) 410 on timing axis 340. By time period 365-*g*, SIM2 has returned to a standby mode, which the WLAN transceiver is operating to support as shown on timing axis 330, while SIM1 continues to operate in an active mode 315 shown on timing axis 320. In this third example, SIM2 transitioned to an active mode, then back to a standby mode, entirely within the time SIM1 had been in an active mode 315 during time period 355-*g*, time period 360-*g*, and time period 365-*g*, such the WWAN transceiver operated to support the standby mode 310 of SIM2 during time period 350-*g*, time period 355-*g*, time period 365-*g*, and time period 370-*g*, while the WLAN transceiver operated to support the active mode of SIM2, including both transmit and receive, during time period 360-g without transferring support for the SIM2 active mode between the WWAN transceiver and the WLAN transceiver.

Figure 4D:
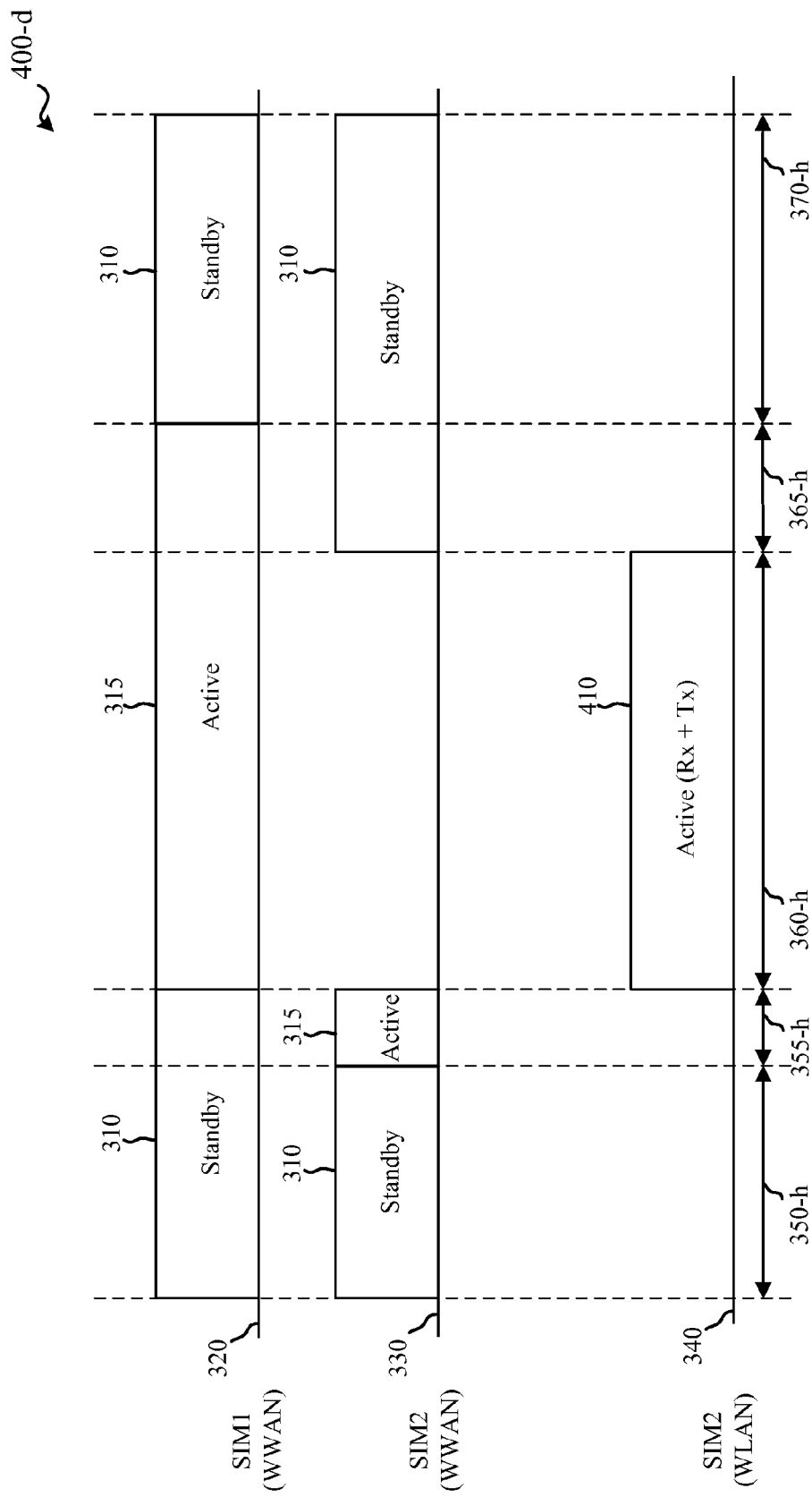
FIG. 4D illustrates a fourth example timing diagram for operation of a multiple-SIM UE using a variation of the first resource mapping for wireless communications, in accordance with various aspects of the present disclosure.

FIG. 4D illustrates a fourth example timing diagram 400-d for operation of a multiple-SIM UE 115 using the variation of the first resource mapping for wireless communications, in accordance with various aspects of the present disclosure. In this fourth example, SIM2 transitions to an active mode 315 during time period 355-h as shown on timing axis 330 prior to when SIM1 transitions to an active mode 315 during time period 360-h and time period 365-h as shown on timing axis 320. Initially, during time period 355-d, the WWAN transceiver operates to support the active mode 315 of SIM2. However, upon detecting that SIM1 has also transitioned to an active mode, during time period 360-h, support for transmit and receive for the active mode is transferred from the WWAN transceiver to the WLAN transceiver, as shown by active (Rx+Tx) 410 on timing axis 340. Once the active mode for SIM2 terminates, SIM2 returns to a standby mode 310 shown on timing axis 330 supported by the WWAN transceiver beginning with time period 365-h and continuing during time period 370-h when SIM1 also returns to a standby mode 310, shown on timing axis 320 during time period 370-h.

Figure 5:
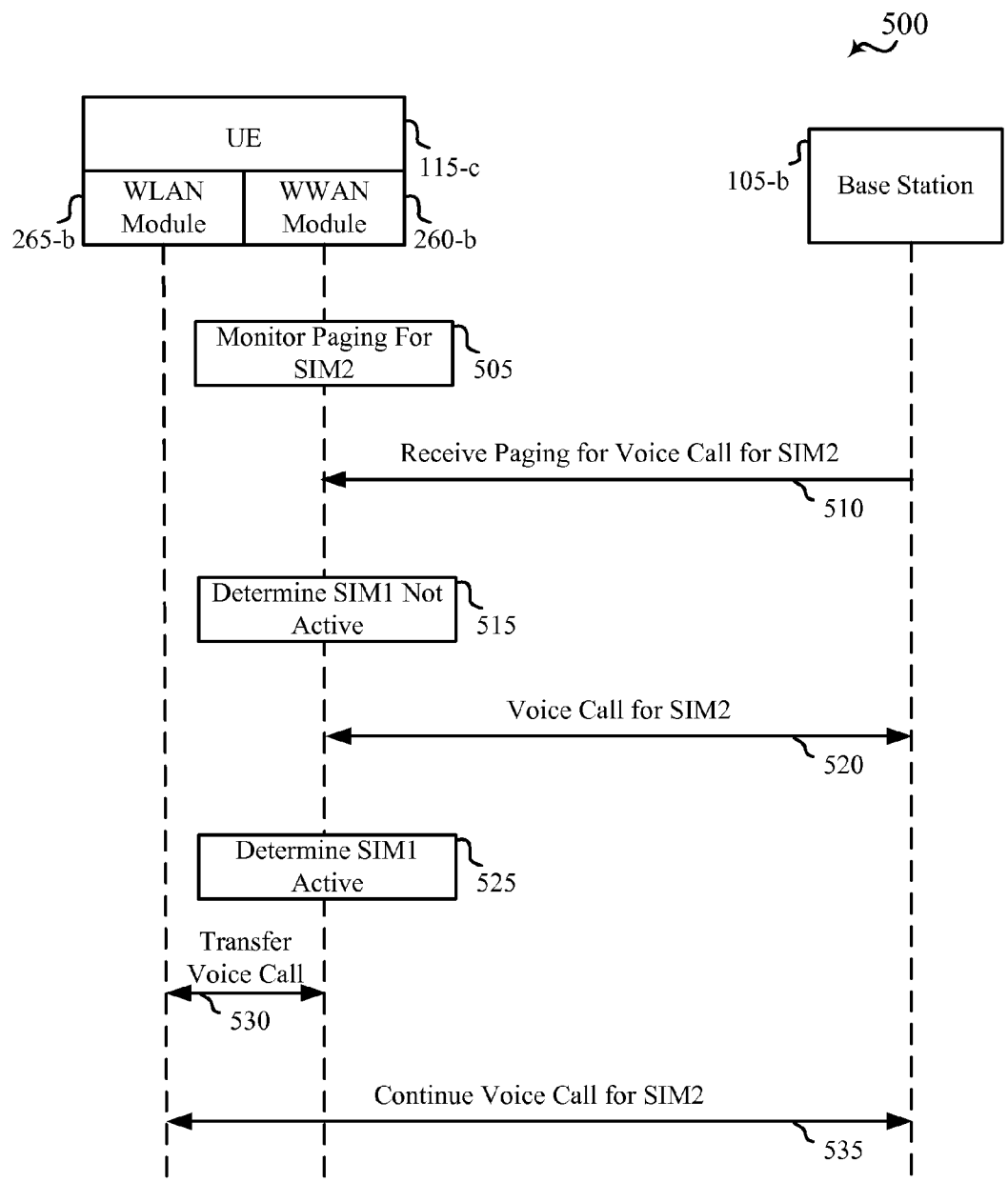
FIG. 5 shows a first example message flow between a multiple SIM UE and a network node, in accordance with various aspects of the present disclosure.

FIG. 5 shows an example message flow 500 between a multiple SIM UE and a network node using the variation of the first resource mapping, in accordance with various aspects of the present disclosure. The UE 115-c may be an example of UE 115-a in system 100 of FIG. 1 or UE 115-b in system 200 of FIGS. 2A and 2B, and may be engaged in both WWAN and WLAN communications. The base station 105-b may be an example of base station 105 included in system 100 of FIG. 1 or of base stations 105-a-1 or 105-a-2 included in system 200 of FIGS. 2A and 2B. WWAN module 260-b and WLAN module 265-b may be an example of WWAN module 260-a and WLAN module 265-a, respectively, included in system 200-b of FIG. 2B.

Initially, both SIM1 and SIM2 are operating in standby modes supported by WWAN module 260-b of the transceiver module for UE 115-c. UE 115-c monitors paging 505 for SIM2 using the resources of the WWAN module 260-b. WWAN module 260-b then receives a paging 510 for a voice call for SIM2 from base station 105-b, so that UE 115-c then determines whether SIM1 is currently operating in an active mode. Since the determination 515 is made that SIM is not currently operating in an active mode, WWAN module 260-b of the WWAN transceiver supports the voice call 520 for SIM2, for both transmit and receive.

During voice call 520, where SIM2 is operating in an active mode and SIM1 is operating in a standby mode, UE 115-c continues to monitor the mode state of SIM1. Once the determination has been made that SIM1 has transitioned to an active mode 525, the WWAN module 260-b transfers support for the voice call to the WWAN module 260-b via one or more messages 530 exchanged between the WWAN module 260-b and the WLAN module 265-b. The transferred voice call 535 then continues, supported by the WLAN module 265-b In the example where SIM2 is associated with a GSM voice subscription, base station 105-b may be a GSM base station, paging 510 for a voice call may be paging for a GSM voice call, and the voice call 520 and the transferred voice call 535 may be GSM voice calls.

Figure 6A:
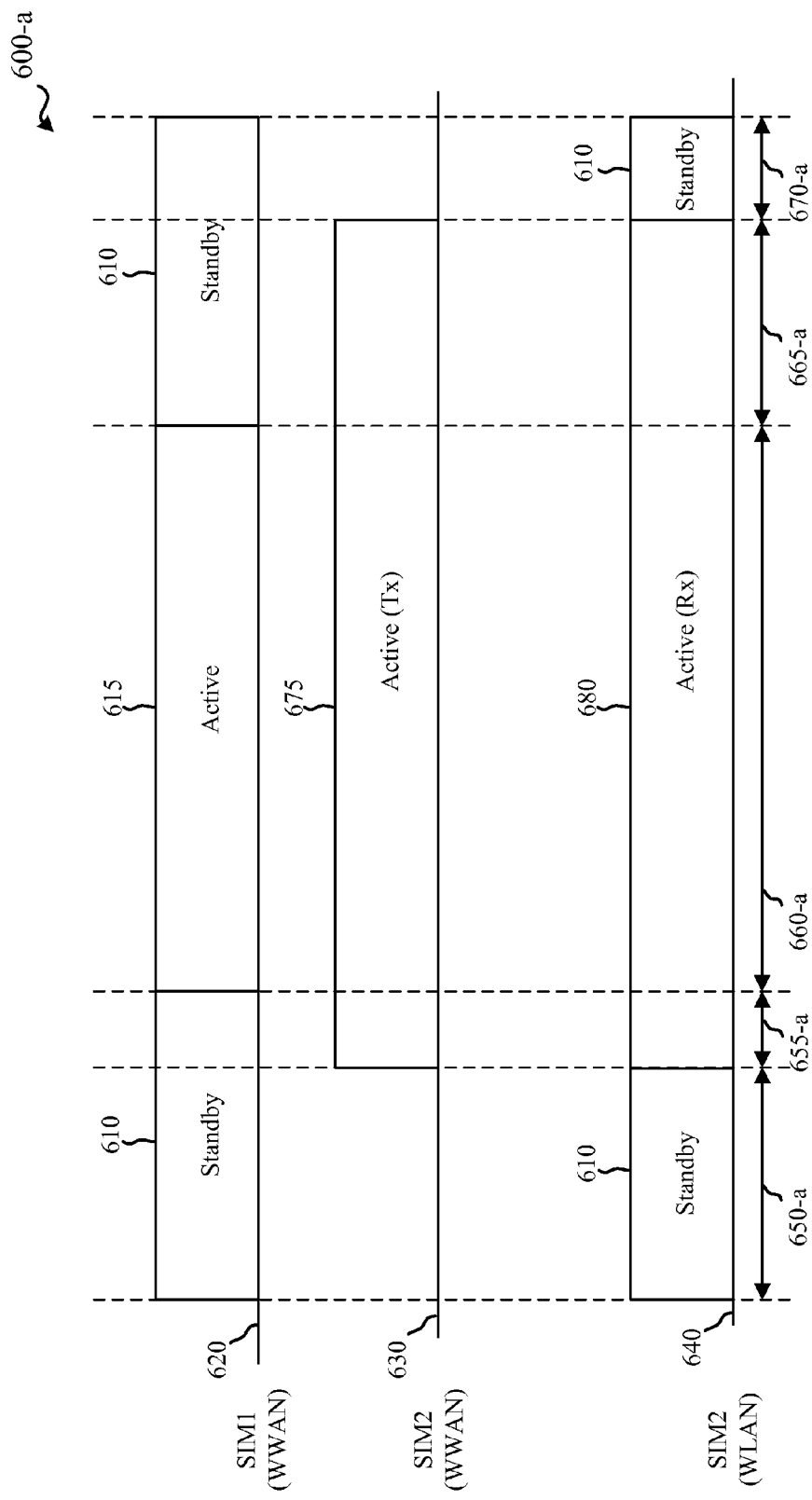
FIG. 6A illustrates a first example timing diagram for operation of a multiple-SIM UE using a second resource mapping for wireless communications, in accordance with various aspects of the present disclosure.

FIG. 6A illustrates a first example timing diagram 600-a for operation of a multiple-SIM UE 115 using a second resource mapping for wireless communications, in accordance with various aspects of the present disclosure. According to the second resource mapping, the WWAN transceiver may operate to support SIM1 when SIM1 is operating in either its standby mode or active mode, regardless of the operating mode of SIM2. For SIM2, the WLAN transceiver may operate to support SIM2 when SIM2 is operating in its standby mode, regardless of whether SIM1 is in a standby mode or an active mode. However, the Rx chain of the WLAN transceiver may operate to support receive for SIM2, and the Tx chain of the WWAN transceiver may operate to support transmit for SIM2, when SIM2 is operating in its active mode.

In this first example of the second resource mapping, initially, during a time period 650-a, SIM1 and SIM2 are each operating in a standby mode 610. The WWAN transceiver is operating to support SIM1, shown on timing axis 620 during time period 650-a, and the WLAN transceiver is operating to support SIM2, shown on timing axis 640 during time period 650-a. During time period 655-a, SIM2 is now operating in an active mode, where the WLAN transceiver operates to support receive for SIM2, shown by active (Rx) 680 on timing axis 640, and the WWAN transceiver operates to support transmit for SIM2, shown by active (Tx) 675 on timing axis 630. During time period 655-a, the WWAN transceiver is still operating to support SIM1 in a standby mode 610, but then SIM1 transitions to an active mode 615 during time period 660-a. However, because the WWAN transceiver operates to support the active (Tx) mode 675 of SIM2, and the WLAN transceiver operates to support the standby mode 610 and active (Rx) mode 680 of SIM2 without regard to the current mode of SIM1, support is not transferred between the WLAN transceiver and WWAN transceiver between time period 655-a and time period 660-a. Similarly, support for SIM2 remains the same when SIM1 returns to a standby mode 610 starting with time period 665-a as shown on timing axis 620, even as the WWAN transceiver continues to operate to support the active (Tx) mode 675 of SIM2, and the WLAN transceiver operates to support the active (Rx) mode 680 of SIM2 during time period 665-a. The WLAN transceiver supports the operation of SIM2 once SIM2 returns to the standby mode 610 during time period 670-a as shown on timing axis 640.

Thus, in the second resource mapping for resource communications where SIM2 is associated with a GSM voice subscription, the WLAN transceiver handles the idle state, and one of transmit or receive for a standalone GSM voice call when SIM1 is inactive, and also handles one of transmit or receive for a GSM voice call when SIM1 is active, without transferring support for some or all of the GSM voice call between the WLAN transceiver and the WWAN transceiver.

Figure 6B:
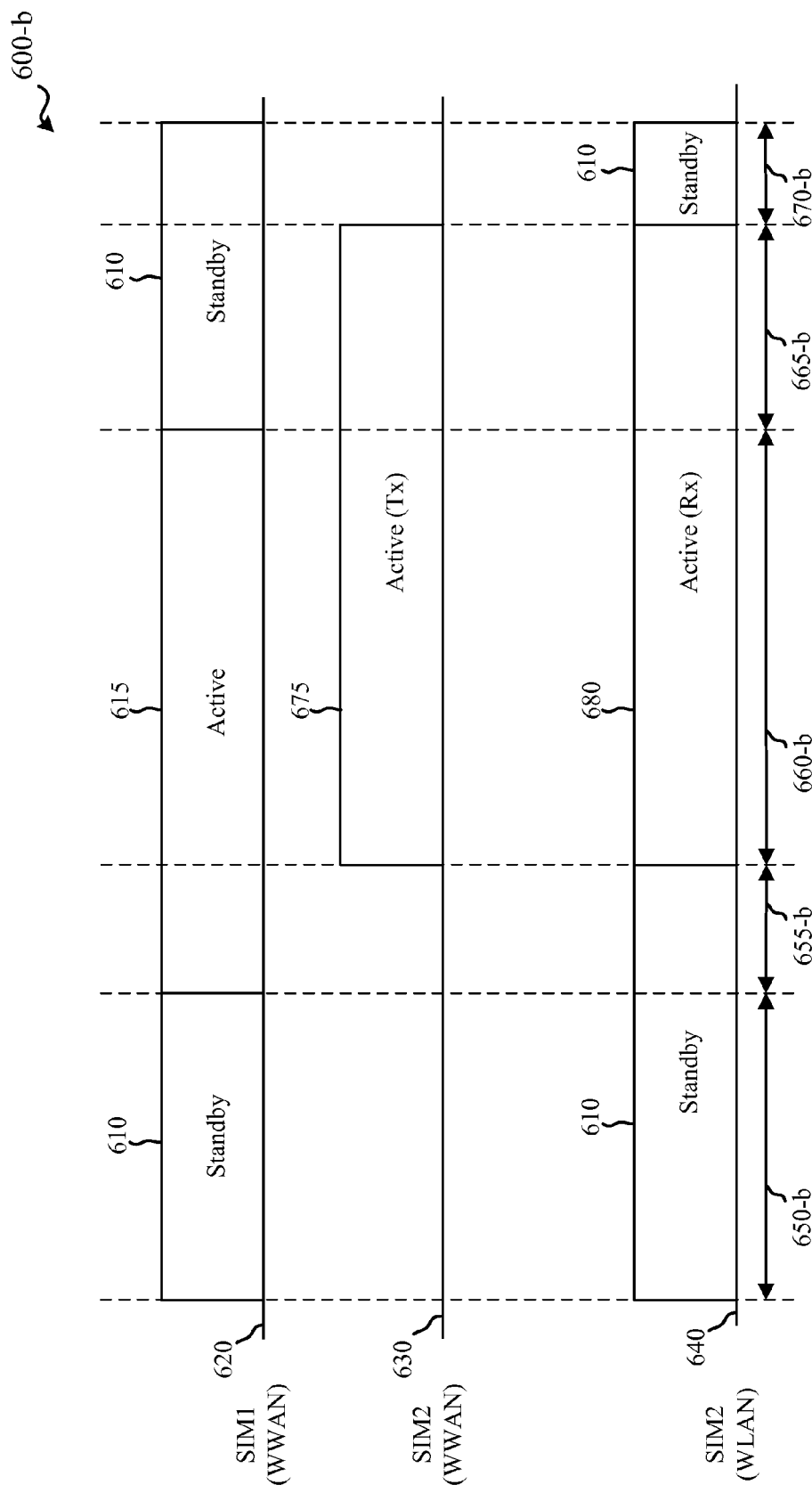
FIG. 6B illustrates a second example timing diagram for operation of a multiple-SIM UE using a second resource mapping for wireless communications, in accordance with various aspects of the present disclosure.

FIG. 6B illustrates a second example timing diagram 600-b for operation of a multiple-SIM UE 115 using the second resource mapping for wireless communications, in accordance with various aspects of the present disclosure. In FIG. 6B, SIM1 goes into an active mode 615 supported by the WWAN transceiver during time period 655-b, shown on timing axis 620, before SIM2 goes into an active mode during time period 660-b, including active (Tx) mode 675 supported by the WWAN transceiver as shown on timing axis 630 and active (Rx) mode 680 supported by the WLAN transceiver as shown on timing axis 640. SIM1 then transitions into a standby mode 610 supported by the WWAN transceiver during time period 665-b, shown on timing axis 620, before SIM2 goes into a standby mode 610 during time period 670-b supported by the WLAN transceiver as shown on timing axis 640. Similar to the timing diagram of FIG. 6A, the WLAN and WWAN transceiver provide support for SIM2 without regard to the current mode of SIM1, such that support for the active (Tx) mode 675 and active (Rx) mode 680 is not transferred between the WLAN transceiver and the WWAN transceiver during an active mode of SIM2 even if the mode state of SIM1 changes.

Figure 6C:
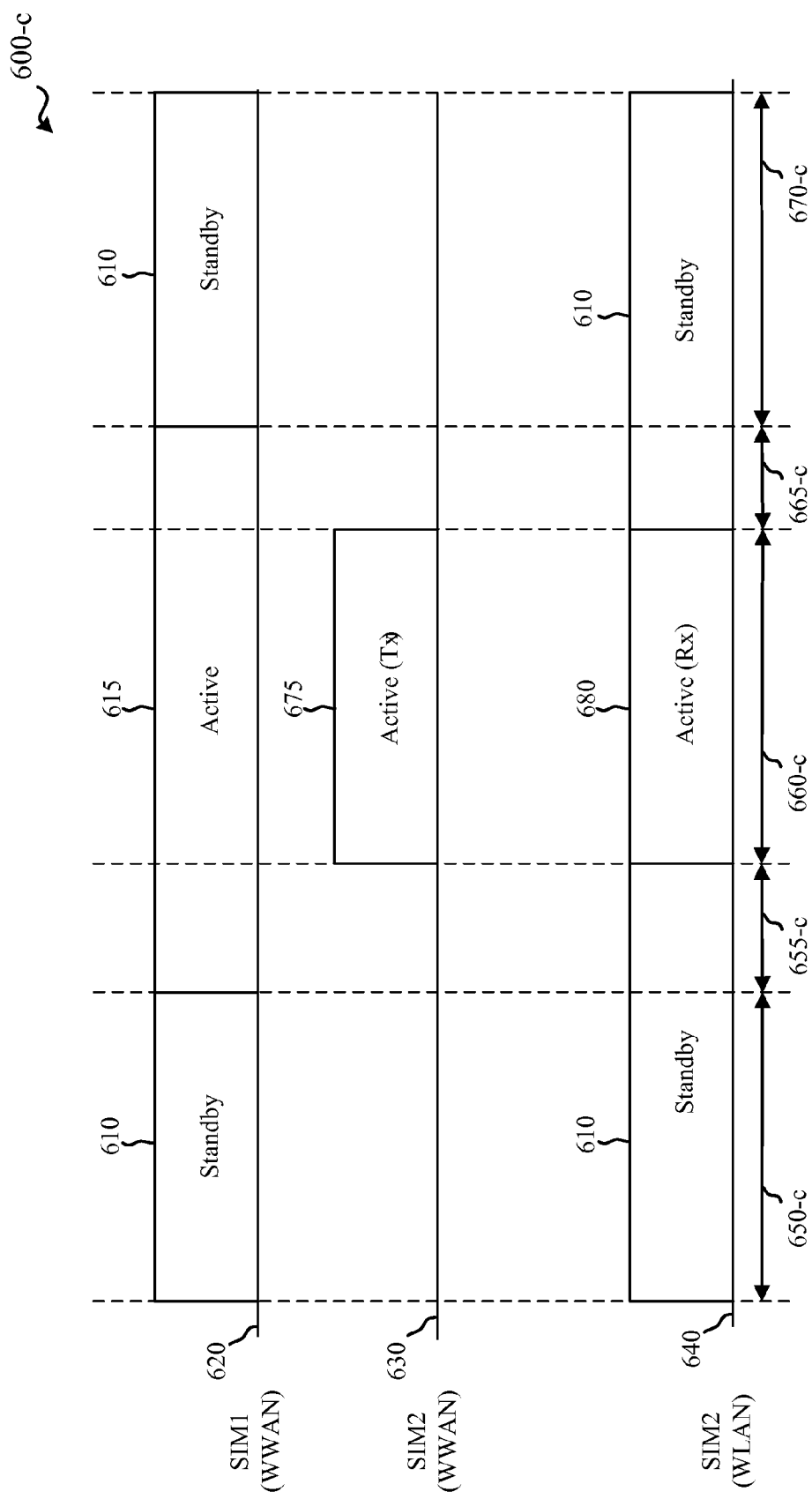
FIG. 6C illustrates a third example timing diagram for operation of a multiple-SIM UE using a second resource mapping for wireless communications, in accordance with various aspects of the present disclosure.

FIG. 6C illustrates a third example timing diagram 600-c for operation of a multiple-SIM UE 115 using the second resource mapping for wireless communications, in accordance with various aspects of the present disclosure. Here, SIM2 transitions between a standby mode 610 during time period 655-c to an active (Rx) mode 680 supported by the WLAN transceiver during time period 660-c and back to the standby mode during time period 665-c as shown on timing axis 640. During time period 660-c the active (Tx) mode of SIM2 is supported by the WWAN transceiver as shown on timing axis 630. These two transitions occur while SIM1 is in an active mode 615 supported by the WWAN transceiver during time period 655-c, time period 660-c, and time period 665-c, and do not affect the support of SIM1 by the WWAN transceiver as shown on timing axis 620. Similarly, the transitions of SIM1 from a standby mode 610 during time period 650-c to an active mode 615 during time period 655-c, and from an active mode 615 during time period 665-c to a standby mode 610 during time period 670-c, as shown on timing axis 620, do not affect the support of SIM2 by the WWAN and WLAN transceivers as shown on timing axis 630 and timing axis 640.

Figure 6D:
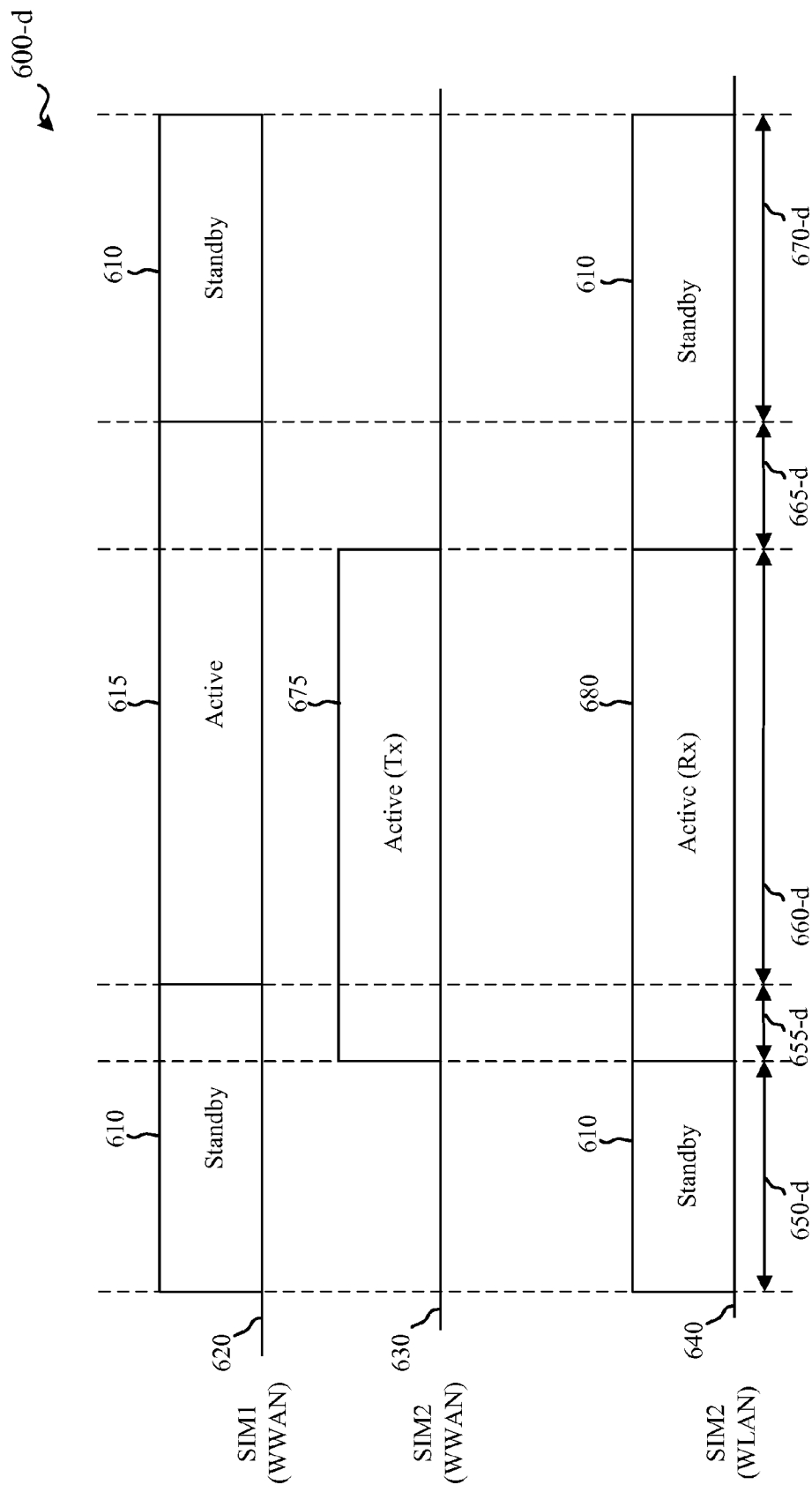
FIG. 6D illustrates a fourth example timing diagram for operation of a multiple-SIM UE using a second resource mapping for wireless communications, in accordance with various aspects of the present disclosure.

FIG. 6D illustrates a fourth example timing diagram 600-d for operation of a multiple-SIM UE 115 using the second resource mapping for wireless communications, in accordance with various aspects of the present disclosure. SIM2 goes into an active mode during time period 655-d, including active (Tx) mode 675 supported by the WWAN transceiver, as shown on timing axis 630, and active (Rx) mode 680 supported by the WLAN transceiver, as shown on timing axis 640, before SIM1 goes into an active mode 615 supported by the WWAN transceiver during time period 660-d, shown on timing axis 620. SIM2 then transitions back into a standby mode 610 supported by the WLAN transceiver during time period 665-d, shown on timing axis 640, before SIM1 goes into a standby mode 610 during time period 670-d supported by the WWAN transceiver as shown on timing axis 620. Similar to the timing diagrams of FIGS. 6A, 6B, 6C, the WLAN and WWAN transceiver provide support for SIM2 without regard to the current mode of SIM1, such that support for the active (Tx) mode 675 and active (Rx) mode 680 is not transferred between the WLAN transceiver and the WWAN transceiver during an active mode of SIM2 even if the mode state of SIM1 changes.

Though FIGS. 6A through 6D are shown where the active (Tx) mode 675 of SIM2 is handled by the WWAN transceiver and the active (Rx) mode 680 is handled by the WLAN transceiver, according to other examples, the active (Tx) mode 675 of SIM2 may be handled by the WLAN transceiver and the active (Rx) mode 680 may be handled by the WWAN transceiver.

According to a variation of the second resource mapping, the WLAN transceiver may operate to support both the active (Tx) mode and the active (Rx) mode of SIM2, in addition to supporting the standby mode of SIM2.

Figure 7:
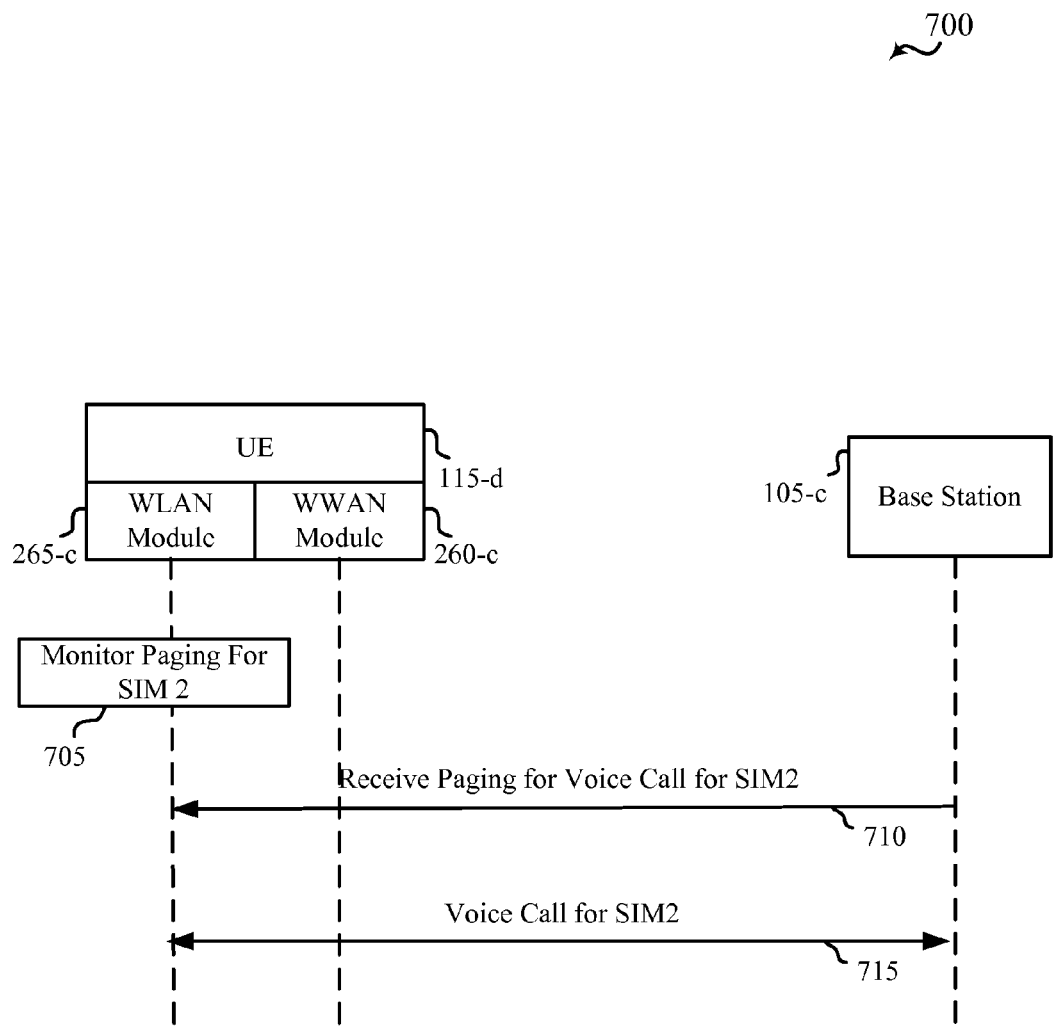
FIG. 7 shows a second example message flow between a multiple SIM UE and a network node, in accordance with various aspects of the present disclosure.

FIG. 7 shows an example message flow 700 between a multiple SIM UE and a network node using the variation of the second resource mapping, in accordance with various aspects of the present disclosure. The UE 115-d may be an example of UE 115-a in system 100 of FIG. 1 or UE 115-b in system 200 of FIGS. 2A and 2B, and may be engaged in both WWAN and WLAN communications. The base station 105-c may be an example of base station 105 included in system 100 of FIG. 1 or of base stations 105-a-1 or 105-a-2 included in system 200 of FIGS. 2A and 2B. WWAN module 260-c and WLAN module 265-c may be an example of WWAN module 260-a and WLAN module 265-a, respectively, included in system 200-b of FIG. 2B.

Initially, SIM2 is operating in a standby mode supported by WLAN module 265-c of the transceiver module for UE 115-d. UE 115-d monitors paging 705 for SIM2 using the resources of the WLAN module 265-c. WLAN module 265-c then receives a paging 710 for a voice call for SIM2 from base station 105-c. WLAN module 265-c of the WLAN transceiver then supports the voice call 715 for SIM2, for both transmit and receive. Throughout, the WWAN may be operating to support SIM1 in a standby mode or in an active mode.

In the example where SIM2 is associated with a GSM voice subscription, base station 105-c may be a GSM base station, paging 710 for a voice call may be paging for a GSM voice call, and the voice call 715 may be a GSM voice call.

Figure 8A:
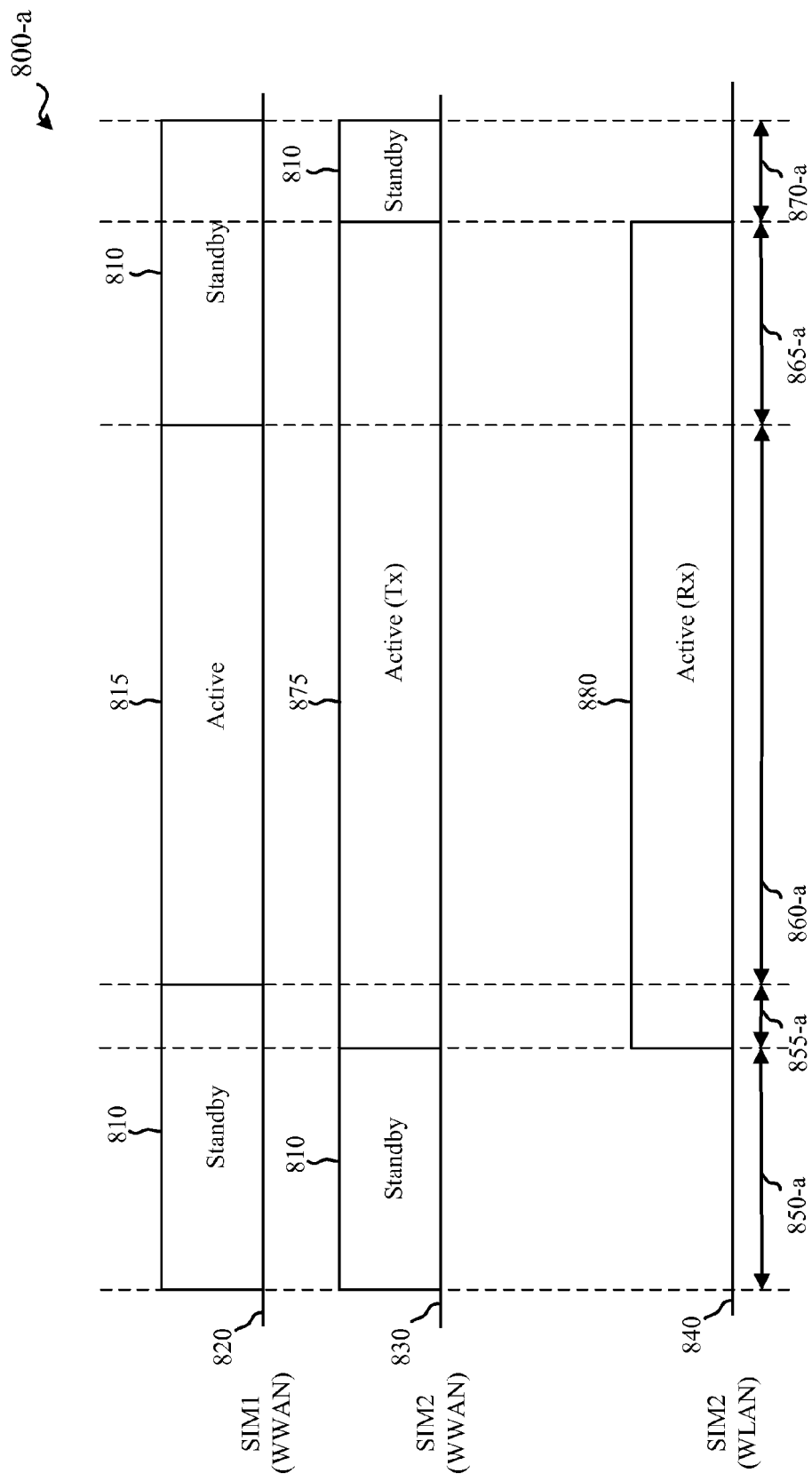
FIG. 8A illustrates a first example timing diagram for operation of a multiple-SIM UE using a third resource mapping for wireless communications, in accordance with various aspects of the present disclosure.

FIG. 8A illustrates a first example timing diagram 800-a for operation of a multiple-SIM UE 115 using a third resource mapping for wireless communications, in accordance with various aspects of the present disclosure. According to the third resource mapping, the WWAN transceiver may operate to support SIM1 when SIM1 is operating in either its standby mode or active mode, regardless of the operating mode of SIM2. For SIM2, the WWAN transceiver may operate to support SIM2 when SIM2 is operating its standby mode, and the Tx chain of the WWAN transceiver may operate to support transmit for SIM2 when operating in its active mode. The Rx chain of the WLAN transceiver may operate to support receive for SIM2 when SIM2 is operating in its active mode. However, support for SIM2 is not transferred between the WLAN transceiver and the WWAN transceiver during an active mode of SIM2 even if the mode state of SIM1 changes.

In this first example of the third resource mapping, initially, during a time period 650-a, SIM1 and SIM2 are each operating in a standby mode 810. The WWAN transceiver is operating to support SIM1, shown on timing axis 820 during time period 850-a, and the WWAN transceiver is operating to support SIM2, shown on timing axis 830 during time period 850-a. During time period 855-a, SIM2 is now operating in an active mode, where the WWAN transceiver operates to support transmit for SIM2, shown by active (Tx) 875 on timing axis 830, and the WLAN transceiver operates to support receive for SIM2, shown by active (Rx) 880 on timing axis 840. During time period 855-a, the WWAN transceiver is still operating to support SIM1 in a standby mode 810. SIM1 then transitions to an active mode 815 during time period 860-a shown on timing axis 820. The WWAN transceiver operates to support the active (Tx) mode 875 of SIM2, and the WLAN transceiver operates to support the standby mode 810 and active (Rx) mode 880 of SIM2 without regard to the current mode of SIM1, support is not transferred between the WLAN transceiver and WWAN transceiver between time period 855-a and time period 860-a. Similarly, support for SIM2 remains the same when SIM1 returns to a standby mode 810 starting with time period 865-a as shown on timing axis 820, even as the WWAN transceiver continues to operate to support the active (Tx) mode 875 of SIM2, and the WLAN transceiver operates to support the active (Rx) mode 880 of SIM2 during time period 865-a. The WWAN transceiver supports the operation of SIM2 once SIM2 returns to the standby mode 810 during time period 870-a as shown on timing axis 830.

Thus, in the second resource mapping for resource communications where SIM2 is associated with a GSM voice subscription, the WWAN transceiver handles the idle state, and one of transmit or receive for a standalone GSM voice call when SIM1 is inactive, and also handles one of transmit or receive for a GSM voice call when SIM1 is active, without transferring support for some or all of the GSM voice call between the WLAN transceiver and the WWAN transceiver.

Figure 8B:
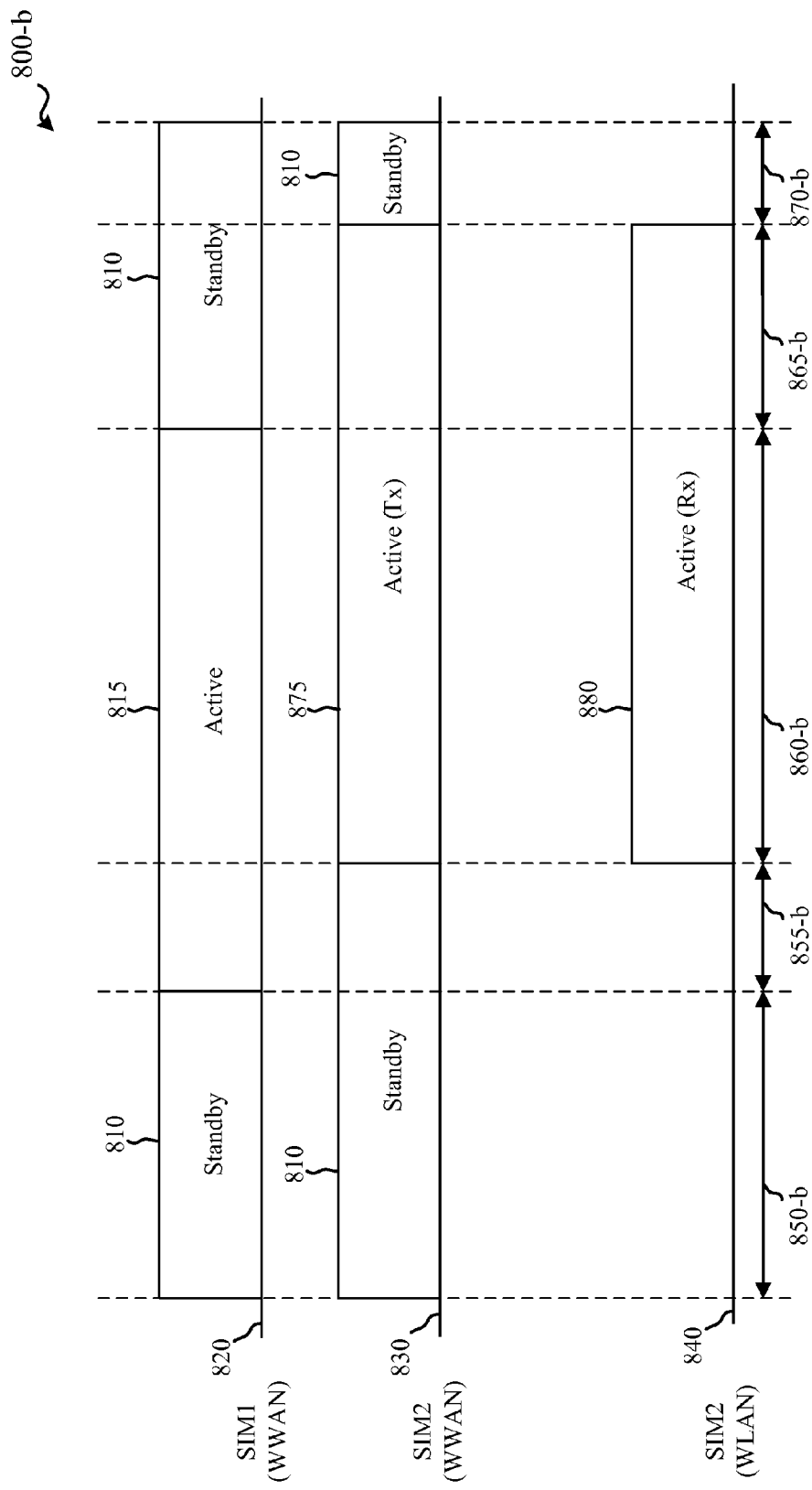
FIG. 8B illustrates a second example timing diagram for operation of a multiple-SIM UE using a third resource mapping for wireless communications, in accordance with various aspects of the present disclosure.

FIG. 8B illustrates a second example timing diagram 800-b for operation of a multiple-SIM UE 115 using the third resource mapping for wireless communications, in accordance with various aspects of the present disclosure. The timing diagram illustrated in FIG. 8B is similar to the timing diagram illustrated in FIG. 6B. However, as shown in FIG. 8B, the standby mode 810 for SIM2 is supported by the WWAN transceiver during time period 850-b, time period 855-b, and time period 870-b, as shown on timing axis 830, whereas as shown in FIG. 6B, the standby mode 610 for SIM2 is supported by the WLAN transceiver during time period 650-b, time period 655-b, and time period 670-b, as shown on timing axis 630. The WWAN transceiver operates to support the active (Tx) mode for SIM2 during time period 860-b and time period 865-b, and the WLAN transceiver operates to support the active (Rx) mode for SIM2 during time period 860-b and time period 865-b, as shown on timing axis 830 and timing axis 840, respectively. Support for the active (Tx) mode 875 and active (Rx) mode 880 of SIM2 is not transferred between the WLAN transceiver and the WWAN transceiver during an active mode of SIM2 even if the mode state of SIM1 changes.

Figure 8C:
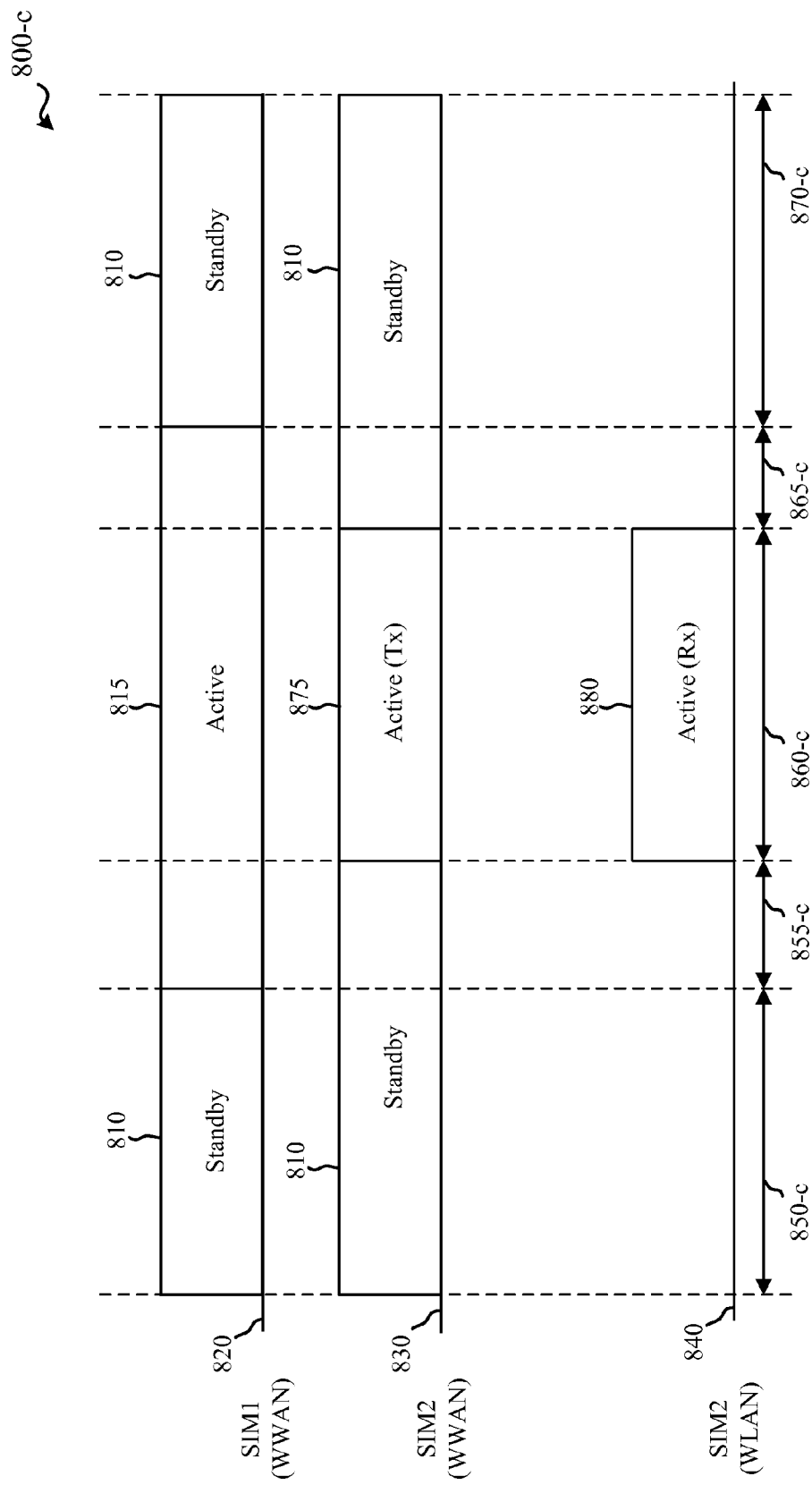
FIG. 8C illustrates a third example timing diagram for operation of a multiple-SIM UE using a third resource mapping for wireless communications, in accordance with various aspects of the present disclosure.
Figure 8D:
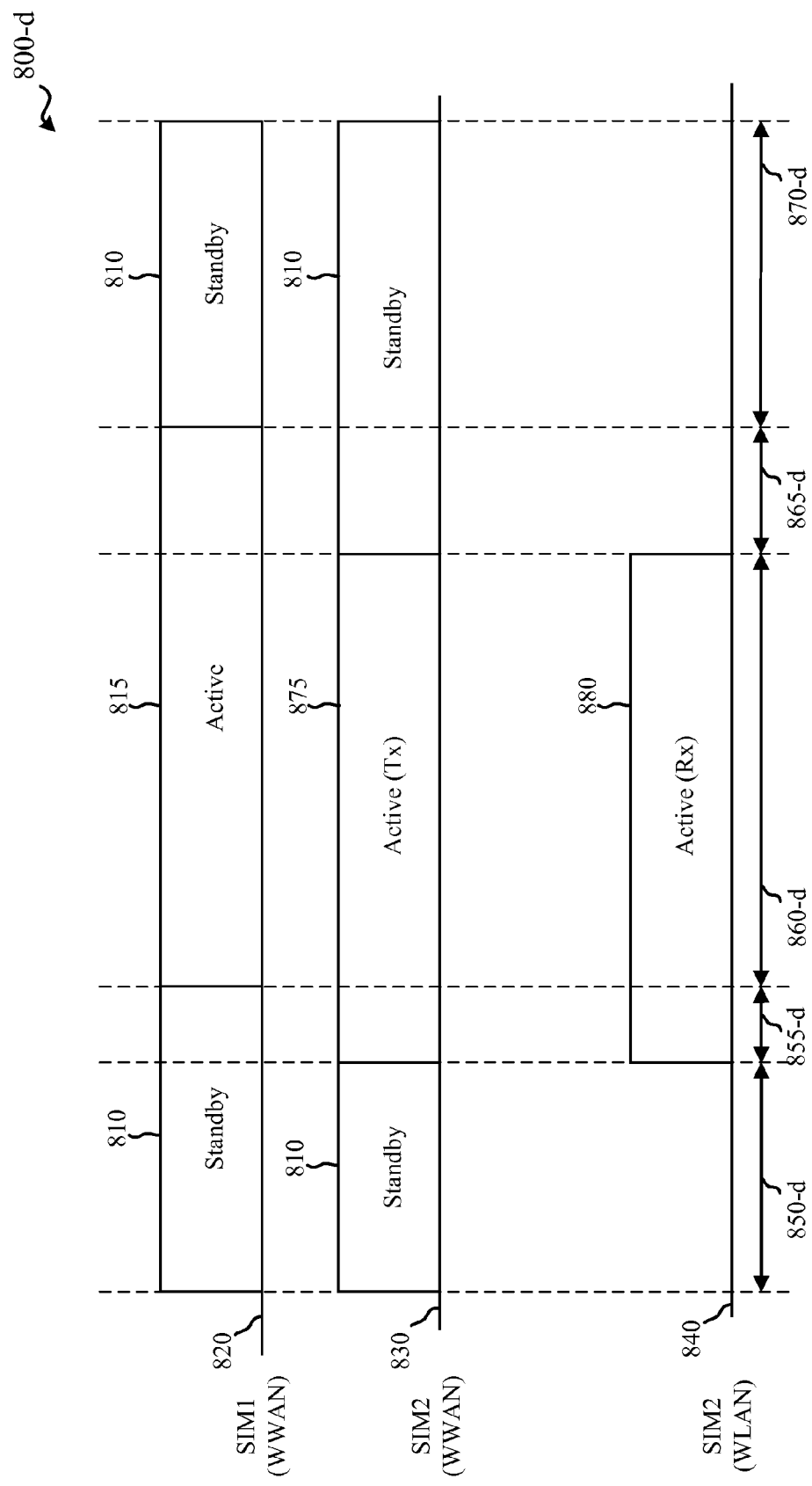
FIG. 8D illustrates a fourth example timing diagram for operation of a multiple-SIM UE using a third resource mapping for wireless communications, in accordance with various aspects of the present disclosure.

Similarly, FIGS. 8C and 8D illustrates a third example timing diagram 800-c and fourth example timing diagram 800-d for operation of a multiple-SIM UE 115 using the third resource mapping for wireless communications, in accordance with various aspects of the present disclosure. The timing diagrams illustrated in FIGS. 8C and 8D are similar to the timing diagrams illustrated in FIGS. 6C and 6D, but as shown in FIGS. 8C and 8D, the standby mode 810 for SIM2 is supported by the WWAN transceiver during time period 850-c, time period 855-c, time period 865-c, time period 870-c, time period 850-d, time period 865-d, and time period 870-d, as shown on timing axis 830, whereas as shown in FIGS. 6C and 6D, the standby mode 610 for SIM2 is supported by the WLAN transceiver during time period 650-c, time period 655-c, time period 665-c, time period 670-c, time period 650-d, time period 665-d, and time period 670-d, as shown on timing axis 630. As also illustrated and described with respect to FIGS. 8A and 8B, support for the active (Tx) mode 875 and active (Rx) mode 880 of SIM2 is not transferred between the WLAN transceiver and the WWAN transceiver during an active mode of SIM2 even if the mode state of SIM1 changes.

Though FIGS. 8A through 8D are shown where the active (Tx) mode 875 of SIM2 is handled by the WWAN transceiver and the active (Rx) mode 880 is handled by the WLAN transceiver, according to other examples, the active (Tx) mode 875 of SIM2 may be handled by the WLAN transceiver and the active (Rx) mode 880 may be handled by the WWAN transceiver.

According to a variation of the third resource mapping, the WLAN transceiver may operate to support both the active (Tx) mode and the active (Rx) mode of SIM2, while the WWAN transceiver may operate to support the standby mode of SIM2.

Figure 9:
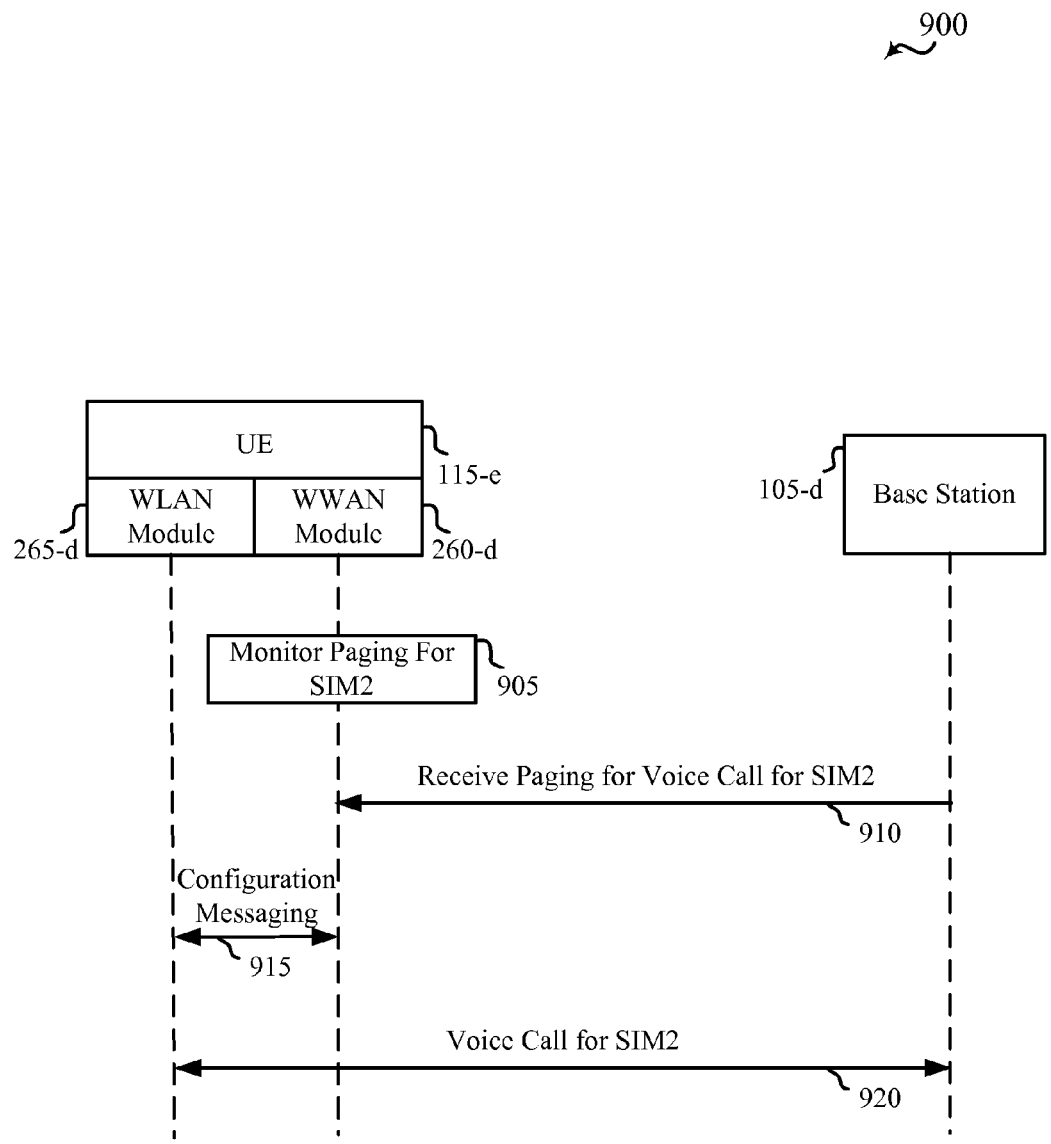
FIG. 9 shows a third example message flow between a multiple SIM UE and a network node, in accordance with various aspects of the present disclosure.

FIG. 9 shows an example message flow 900 between a multiple SIM UE and a network node using the variation of the third resource mapping, in accordance with various aspects of the present disclosure. The UE 115-d may be an example of UE 115-a in system 100 of FIG. 1 or UE 115-b in system 200 of FIGS. 2A and 2B, and may be engaged in both WWAN and WLAN communications. The base station 105-d may be an example of base station 105 included in system 100 of FIG. 1 or of base stations 105-a-1 or 105-a-2 included in system 200 of FIGS. 2A and 2B. WWAN module 260-d and WLAN module 265-d may be an example of WWAN module 260-a and WLAN module 265-a, respectively, included in system 200-b of FIG. 2B.

Initially, SIM2 is operating in a standby mode supported by WWAN module 260-d of the transceiver module for UE 115-d. UE 115-d monitors paging 905 for SIM2 using the resources of the WLAN module 265-d. WLAN module 265-d then receives a paging 910 for a voice call for SIM2 from base station 105-d. Configuration messaging 915 then passes between WWAN module 260-d and WLAN module 265-d, and then WLAN module 265-d of the WLAN transceiver supports the voice call 920 for SIM2, for both transmit and receive. Throughout, the WWAN may be operating to support SIM1 in a standby mode or in an active mode.

In the example where SIM2 is associated with a GSM voice subscription, base station 105-d may be a GSM base station, paging 910 for a voice call may be paging for a GSM voice call, and the voice call 920 may be a GSM voice call.

Figure 10A:
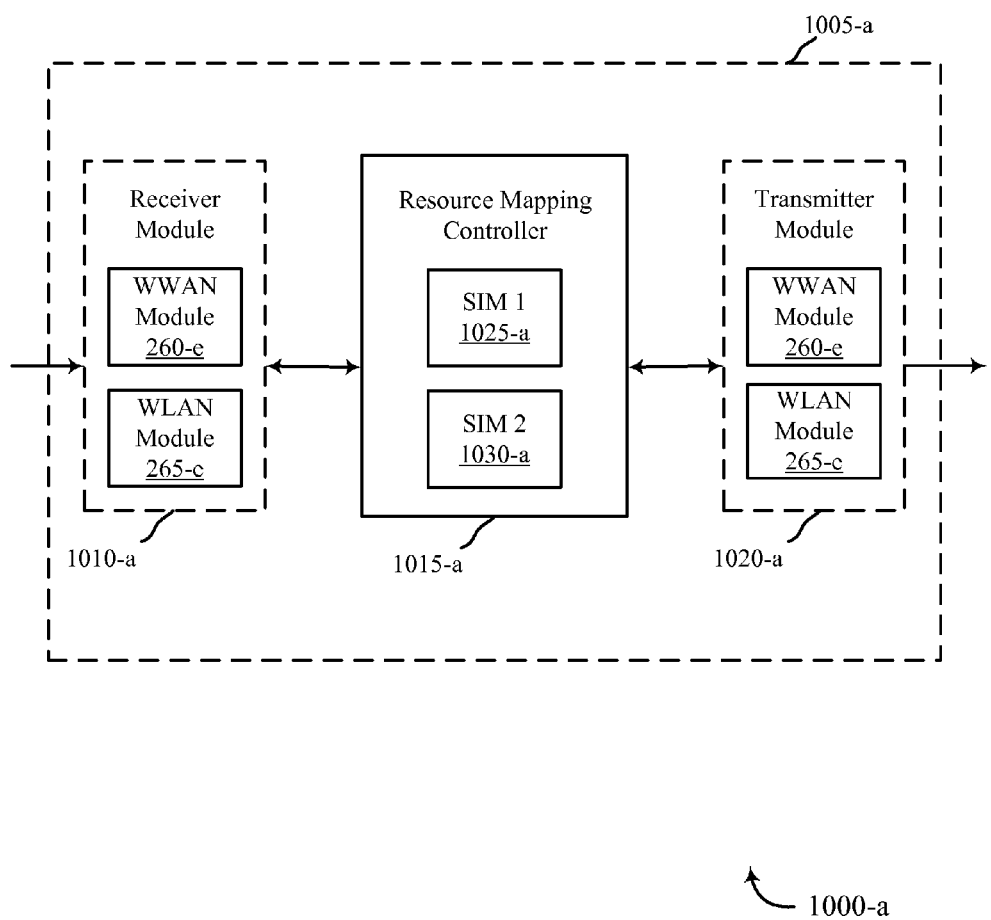
FIG. 10A shows a block diagram of a device for use in wireless communication, in accordance with various aspects of the present disclosure.

FIG. 10A shows a block diagram 1000-a of an apparatus 1005-a for use in wireless communication, in accordance with various examples. The apparatus 1005-a may be an example of one or more aspects of a UE 115 described with reference to FIGS. 1 and/or 2. The apparatus 1005-a may include a receiver module 1010-a, a resource mapping controller 1015-a, and/or a transmitter module 1020-a. The apparatus 1005-a may also include a processor (not shown). Each of these components may be in communication with each other.

The receiver module 1010-a may include a WWAN module 260-e and a WLAN module 265-e. The WWAN module 260-e may be used for processing a received WWAN communication. The WWAN module 260-e may include some or all of the components of Tx and Rx chains of a WWAN modem. The WWAN module 260-e may also route the received WWAN communication to the WLAN module 265-e for processing. The WLAN module 265-e may include some or all of the components of Tx and Rx chains of a WLAN modem. The WLAN module 265-e may process both WLAN and WWAN communications. The WWAN communications may be processed by a portion of the components in the WLAN module 265-e, and then passed to the resource mapping controller 1015-a for baseband processing.

The resource mapping controller 1015-a may include some or all of the components of the WWAN module 260-e and/or WLAN module 265-e, and/or control the operation of the WWAN module 260-e and WLAN module 265-e. The resource mapping controller 1015-a may include a first SIM (SIM1) 1025-a and a second SIM (SIM2) 1030-a. In some examples, the resource mapping controller 1015-a may include additional SIMs (not shown). WWAN communications over a first communications network may support the first SIM 1025-a. WWAN communications over a second communications network may support SIM2 1030-a. Each additional SIM (not shown) may support WWAN communications over additional communications networks. SIM1 1025-a and SIM2 1030-a may be active simultaneously, which may allow the apparatus 1005-a to support active communications over two communications networks. The resource mapping controller 1015-*a* may also support WLAN communications at the same time as WWAN communications according to different resource mapping scenarios, including, for example, the first resource mapping scenario described above (including with respect to FIGS. 3A through 3D and FIGS. 4A through 4D), the variation on the first resource mapping scenario (including with respect to FIG. 5), the second resource mapping scenario described above (including with respect to FIGS. 6A through 6D), the variation on the second resource mapping scenario (including with respect to FIG. 7), the third resource mapping scenario described above (including with respect to FIGS. 8A through 8D), and the variation on the third resource mapping scenario (including with respect to FIG. 9).

The transmitter module 1020-*a* may be co-located with the receiver module 1010-*a* and may also include the WWAN module 260-*e* and the WLAN module 265-*e*. The WWAN module 260-*e* may be used for processing a WWAN communication prior to transmission. The WLAN module 265-*e* may process both WLAN and WWAN communications prior to transmission. The WWAN communication may be processed by a portion of the components in the WLAN module 265-*e*. The WLAN module 265-*e* may then route the WWAN communication to the WWAN module 260-*e* for further processing and transmission over a WWAN antenna.

Figure 10B:
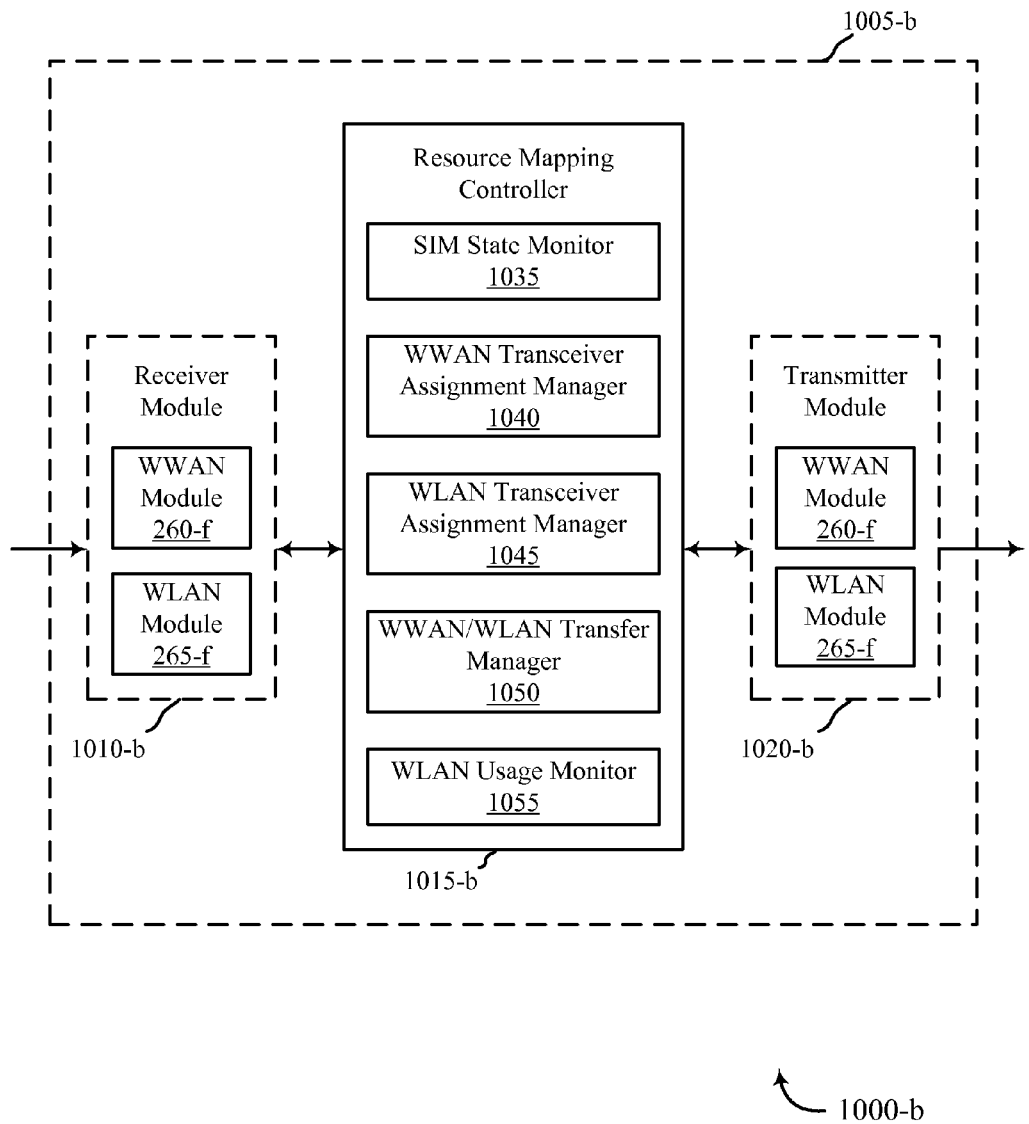
FIG. 10B shows a block diagram of a device for use in wireless communication, in accordance with various aspects of the present disclosure.

FIG. 10B shows a block diagram 1000-*b* of an apparatus 1005-*b* that is used in a wireless device for wireless communication, in accordance with various examples. The apparatus 1005-*b* may be an example of one or more aspects of a UE 115 described with reference to FIGS. 1 and 2. It may also be an example of an apparatus 1005-*a* described with reference to FIG. 10A. The apparatus 1005-*b* may include a receiver module 1010-*b*, a resource mapping controller 1015-*b*, and/or a transmitter module 1020-*b*, which may be examples of the corresponding modules of apparatus 1005-*a*. The apparatus 1005-*b* may also include a processor (not shown). Each of these modules may be in communication with each other. The resource mapping controller 1015-*b* may include a SIM state monitor 1035, a WWAN transceiver assignment manager 1040, a WLAN transceiver assignment manger 1045, a WWAN/WLAN transfer manager 1050, and a WLAN usage monitor 1055. The receiver module 1010-*b* and the transmitter module 1020-*b* may perform the functions of the receiver module 1010-*a* and the transmitter module 1020-*a*, of FIG. 10A, respectively, and may each include a WWAN module 260-*f* and a WLAN module 265-*f*.

The SIM state monitor 1035 monitors the operating mode of each SIM of the UE 115, including each of SIM1 1025 and SIM2 1030, and including any additional SIMs (not shown) also present in UE 115. SIM1 1025 may operate in one of a number of modes, including an active mode and a standby (or idle) mode.

The a WWAN transceiver assignment manager 1040 allocates WWAN transceiver resources to support one or more, or none, of the SIMs present in UE 115, where such allocation may be based in part on the operating mode of one or more SIMs. For example, where SIM1 is in an active mode, the WWAN transceiver may allocate portions of the WWAN transceiver chain to operate in support of a voice call for SIM1, to the exclusion of resource allocations in support of other SIMs of UE 115.

The WLAN transceiver assignment manger 1045 allocates WLAN transceiver resources to support one or more, or none, of the SIMs present in UE 115, where such allocation may be based in part on the operating mode of one or more SIMs. The allocation of resources may also be based in part on the usage of the WLAN transceiver to support Wi-Fi, Bluetooth, or other WLAN functions unrelated to the SIMs. For example, the WLAN transceiver is actively communicating with a Wi-Fi network, the WLAN transceiver may allocate the transmit portion of a WLAN transceiver chain, but not a receive portion of a WLAN transceiver chain, to operate in support of a voice call for SIM2 rather than allocating both the transmit and receive portion of the WLAN transceiver chain to operate in support of the voice call for SIM2.

The WWAN/WLAN transfer manager 1050 helps manage a transfer of operation in support of a SIM between one or more WWAN transceivers and one or more WLAN transceivers.

The WLAN usage monitor 1055 monitors the usage of the WLAN transceiver to determine availability of resources of the WLAN transceiver chain to support one or more of the SIMs. For example, the WLAN usage monitor 1055 may report to the WLAN transceiver assignment manger 1045 that the WLAN transceiver is actively communicating with a Wi-Fi network.

Figure 11:
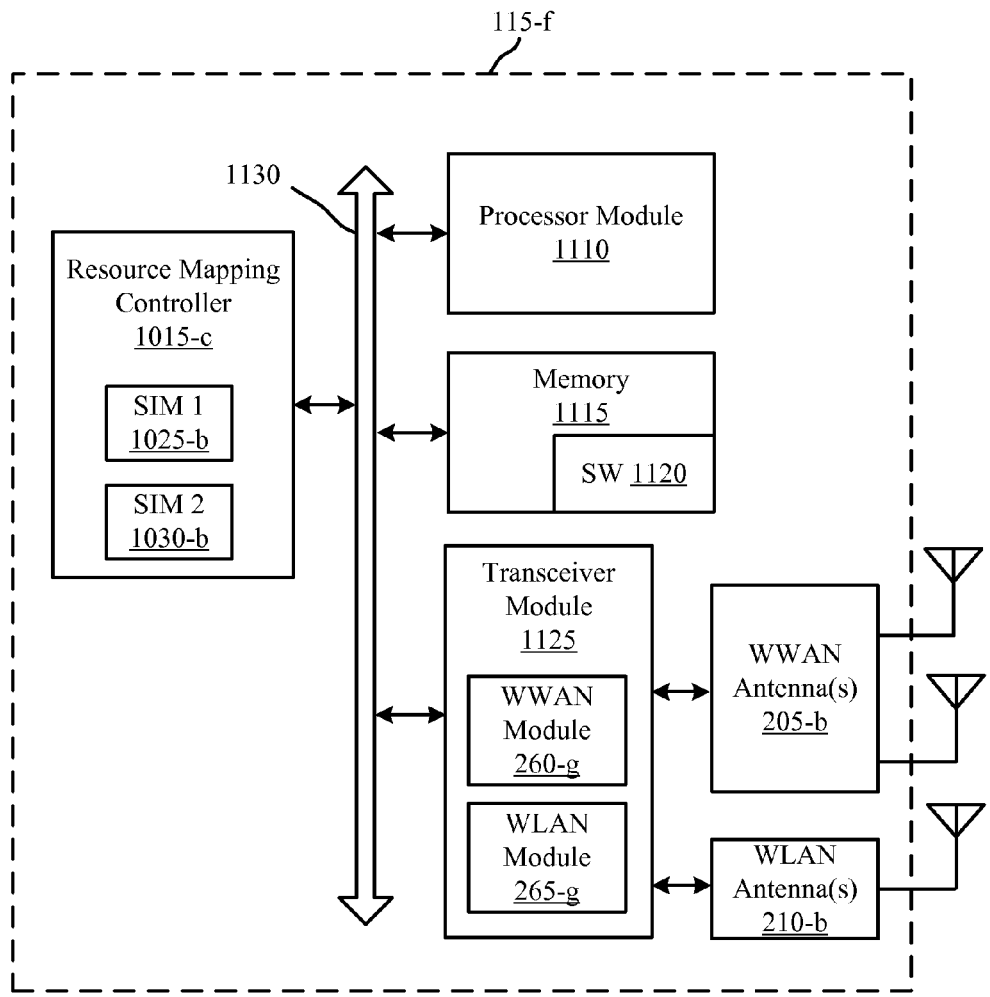
FIG. 11 shows a system for use in wireless communication, in accordance with various aspects of the present disclosure.

FIG. 11 shows a system 1100 for use in wireless communication, in accordance with various examples. System 1100 may include a UE 115-*f*, which may be an example of the UEs 115 of FIGS. 1, 2, 5, 7, and/or 9. UE 115-*f* may also be an example of one or more aspects of apparatus 1005 of FIGS. 10A and/or 10B.

The UE 115-*f* may generally include components for bi-directional voice and data communications including components for transmitting communications and components for receiving communications. The UE 115-*f* may include WWAN antenna(s) 205-*b*, WLAN antenna(s) 210-*b*, a transceiver module 1125, a processor module 1110, and memory 1115 (including software (SW) 1120), which each may communicate, directly or indirectly, with each other (e.g., via one or more buses 1130). The transceiver module 1125 may be configured to communicate bi-directionally, via the WWAN antenna(s) 205-*b*, the WLAN antenna(s) 210-*b*, and/or one or more wired or wireless links, with one or more networks, as described above. For example, the transceiver module 1125 may be configured to communicate bi-directionally with base stations 105 and with the APs 110 with reference to FIGS. 1 and/or 2. The transceiver module 1125 may include a WWAN module 260-*g* configured to modulate the packets and provide the modulated packets to the WWAN antenna(s) 205-*b* for transmission, and to demodulate packets received from the WWAN antenna(s) 205-*b*.

The UE 115-*f* may have multiple WWAN antenna(s) 205-*b* capable of concurrently transmitting and/or receiving multiple wireless communications. The transceiver module 1125 may be capable of concurrently communicating with one or more base stations 105 via multiple component carriers and/or communications networks. Additionally, the transceiver module 1125 may include a WLAN module 265-*g* configured to modulate the packets and provide the modulated packets to the WLAN antenna(s) 210-*b* for transmission, and to demodulate packets received from the WLAN antenna(s) 210-*b*. The UE 115-*f* may have multiple WLAN antenna(s) 210-*b* capable of concurrently transmitting and/or receiving multiple wireless communications. The transceiver module 1125 may be capable of communicating with one or more APs 110 via the WLAN antenna(s) 210-*b*. The transceiver module 1125 may use a portion of the components in the WLAN module 265-*g* to process WWAN communications received over the WWAN antenna(s) 205-

*b*. The transceiver module 1125 may also use a portion of the components in the WLAN module 265-*g* to process WWAN communications prior to transmission over the WWAN antenna(s) 205-*b*.

The UE 115-*f* may include a resource mapping controller 1015-*c*, which may perform the functions described above for the resource mapping controller 1015 of apparatus 1005 of FIGS. 10A and 10B and/or of UE 115 of FIGS. 5, 7, and 9 and/or as described for a UE 115 with respect to the timing diagrams of FIGS. 3A through 4D, 6A through 6D, and 8A through 8D. The resource mapping controller 1015-*c* may include a SIM1 1025-*b* and a SIM2 1030-*b*. WWAN communications over a first communications network may support SIM1 1025-*b*, and WWAN communications over a second communications network may support SIM2 1030-*b*.

The memory 1115 may include random access memory (RAM) and read-only memory (ROM). The memory 1115 may store computer-readable, computer-executable software/firmware code 1120 containing instructions that are configured to, when executed, cause the processor module 1110 to perform various functions described herein (e.g., map support for a SIM operation for a wireless communication to one or both of the WWAN transceiver and WLAN transceiver according to a resource mapping, etc.). Alternatively, the computer-readable, computer-executable software/firmware code 1120 may not be directly executable by the processor module 1110 but be configured to cause a computer (e.g., when compiled and executed) to perform functions described herein. The processor module 1110 may include an intelligent hardware device, e.g., a central processing unit (CPU), a microcontroller, an application-specific integrated circuit (ASIC), etc.

Figure 12:
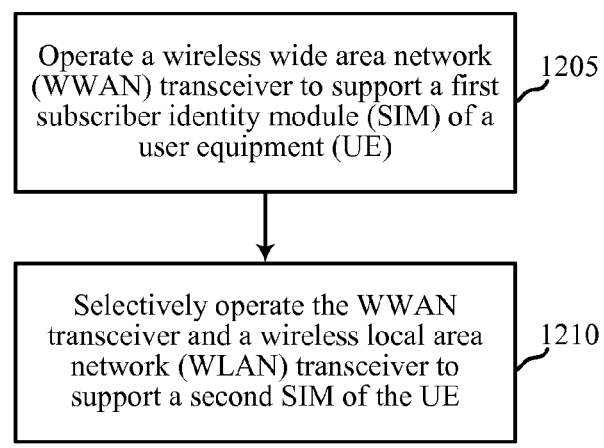
FIG. 12 is a flow chart illustrating a first example of a method for wireless communication, in accordance with various aspects of the present disclosure.

FIG. 12 is a flow chart illustrating a first example of a method 1200 for wireless communication, in accordance with various aspects of the present disclosure. For clarity, the method 1200 is described below with reference to aspects of one or more of the wireless devices described with reference to FIGS. 1, 2A, 2B, 10A, 10B, and/or 11. In some examples, a wireless device may execute one or more sets of codes to control the functional elements of the wireless device to perform the functions described below. Additionally or alternatively, the wireless device may perform one or more of the functions described below using-purpose hardware.

At block 1205, the method 1200 may include operating a wireless wide area network WWAN transceiver to support SIM1 of a UE. Such operation may be in accord with one or more of the resource mappings shown and described with respect to the timing diagrams and message flows of FIGS. 3A through 9, and specifically with respect to the operation of the WWAN transceiver to support SIM1 during one or more of an active mode and a standby mode of SIM1.

At block 1210, the method 1200 may include selectively operating the WWAN transceiver and a WLAN transceiver to support or not SIM2 of the UE. Such operation may be in accord with one or more of the resource mappings shown and described with respect to the timing diagrams and message flows of FIGS. 3A through 9, and specifically with respect to the operation of the WWAN transceiver and the WLAN transceiver to support or not SIM2 during one or more of an active mode and a standby mode of SIM2.

The operations at blocks 1205 and 1210 may be performed using the resource mapping controller 1015 described with reference to FIGS. 10A, 10B and 11.

Thus, the method 1200 may provide for wireless communication. It should be noted that the method 1200 is just one implementation and that the operations of the method 1200 may be rearranged or otherwise modified such that other implementations are possible.

Figure 13:
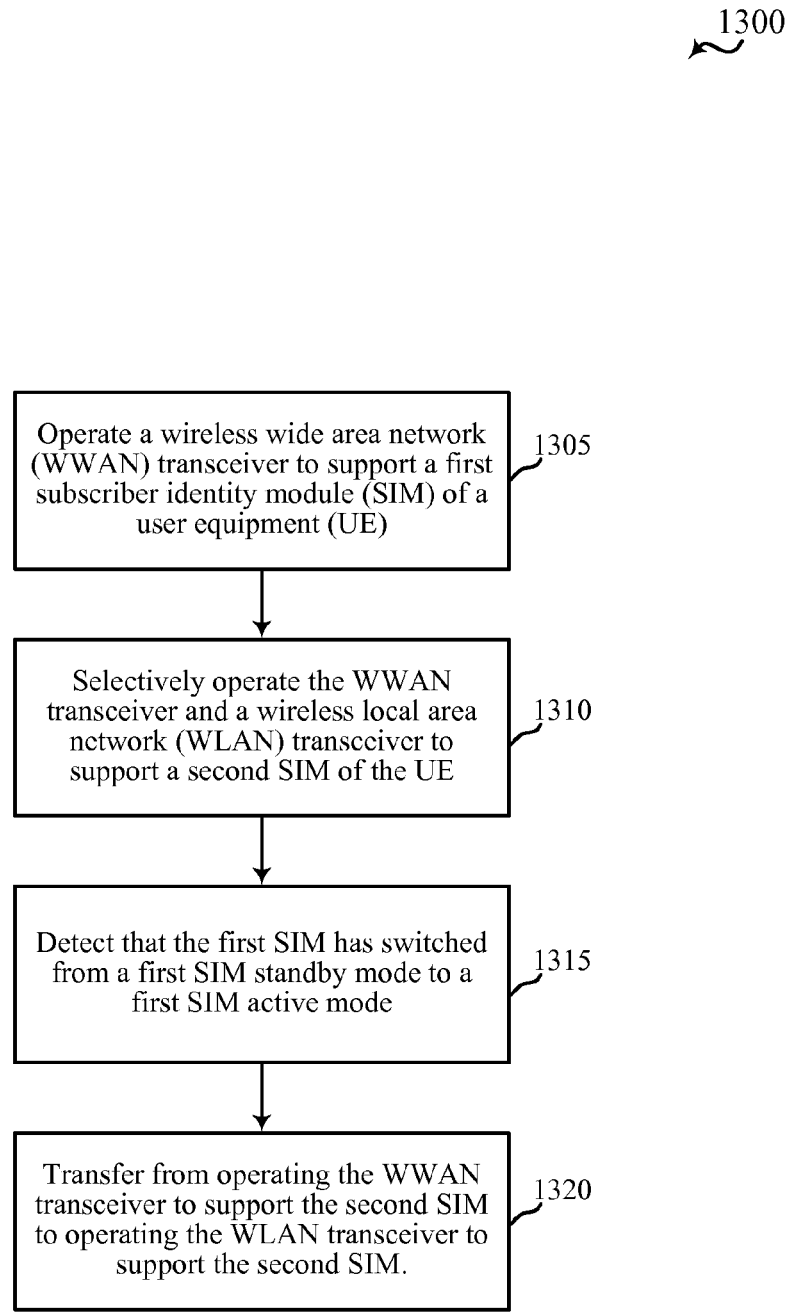
FIG. 13 is a flow chart illustrating a second example of a method for wireless communication, in accordance with various aspects of the present disclosure.

FIG. 13 is a flow chart illustrating a first example of a method 1300 for wireless communication, in accordance with various aspects of the present disclosure. For clarity, the method 1300 is described below with reference to aspects of one or more of the wireless devices described with reference to FIGS. 1, 2A, 2B, 10A, 10B, and/or 11. In some examples, a wireless device may execute one or more sets of codes to control the functional elements of the wireless device to perform the functions described below. Additionally or alternatively, the wireless device may perform one or more of the functions described below using-purpose hardware.

At block 1305, the method 1300 may include operating a wireless wide area network WWAN transceiver to support SIM1 of a UE. Such operation may be in accord with one or more of the resource mappings shown and described with respect to the timing diagrams and message flows of FIGS. 3A through 9, and specifically with respect to the operation of the WWAN transceiver to support SIM1 during one or more of an active mode and a standby mode of SIM1.

At block 1310, the method 1300 may include selectively operating the WWAN transceiver and a WLAN transceiver to support or not SIM2 of the UE. Such operation may be in accord with one or more of the resource mappings shown and described with respect to the timing diagrams and message flows of FIGS. 3A through 9, and specifically with respect to the operation of the WWAN transceiver and the WLAN transceiver to support or not SIM2 during one or more of an active mode and a standby mode of SIM2.

At block 1315, the method 1300 may include detecting that SIM1 has switched from a SIM1 standby mode to a SIM1 active mode. Such operation may be in accord with one or more of the resource mappings shown and described with respect to the timing diagrams and message flows of FIGS. 3A through 9, and specifically with respect to the operation of the WWAN transceiver to support SIM1 during transitions from a standby mode 310 to an active mode 315 as shown on timing axis 320 for FIGS. 3A through 4D, during transitions from a standby mode 610 to an active mode 615 as shown on timing axis 620 for FIGS. 6A through 6D, and/or during transitions from a standby mode 810 to an active mode 815 as shown on timing axis 820 for FIGS. 8A through 8D.

At block 1320, the method 1300 may include transferring from operating the WWAN transceiver to support SIM2 to operating the WLAN transceiver to support SIM2. Such operation may be in accord with one or more of the resource mappings shown and described with respect to the timing diagrams and message flows of FIGS. 3A through 9, and specifically with respect to transferring the operation of the WWAN transceiver to support SIM2 as shown on timing axis 330 for FIGS. 3A through 4D, as shown on timing axis 630 for FIGS. 6A through 6D, and/or as shown on timing axis 830 for FIGS. 8A through 8D, to operating the WLAN transceiver to support SIM2 as shown on timing axis 340 for FIGS. 3A through 4D, as shown on timing axis 640 for FIGS. 6A through 6D, and/or as shown on timing axis 840 for FIGS. 8A through 8D.

The operations at blocks 1305, 1310, 1315, and 1320 may be performed using the resource mapping controller 1015 described with reference to FIGS. 10A, 10B and 11.

Thus, the method 1300 may provide for wireless communication. It should be noted that the method 1300 is just one implementation and that the operations of the method 1300 may be rearranged or otherwise modified such that other implementations are possible.

In some examples, aspects from two or more of the methods 1200 and 1300 may be combined. It should be noted that the methods 1200, 1300 are just example implementations, and that the operations of the methods 1200, 1300 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   operating a wireless wide area network (WWAN) transceiver to support a first subscriber identity module (SIM) of a user equipment (UE); and
   selectively operating the WWAN transceiver and a wireless local area network (WLAN) transceiver to support a second SIM of the UE.

2. The method of claim 1, further comprising:
   detecting that the first SIM has switched from a first SIM standby mode to a first SIM active mode; and
   transferring from operating the WWAN transceiver to support the second SIM to operating the WLAN transceiver to support the second SIM.

3. The method of claim 1, wherein selectively operating the WWAN transceiver and the WLAN transceiver to support the second SIM further comprises:
   operating the WLAN transceiver to support the second SIM during a first period while the first SIM is in a first SIM active mode; and
   operating the WLAN transceiver to support the second SIM during a second period while the first SIM is in a first SIM standby mode and the second SIM is in a second SIM standby mode.

4. The method of claim 1, further comprising:
monitoring paging, by the WWAN transceiver, for the second SIM to detect a voice call for the second SIM; and
operating the WLAN transceiver to support the voice call for the second SIM while the first SIM is in a first SIM active mode.

5. The method of claim 1, wherein selectively operating the WWAN transceiver and the WLAN transceiver to support the second SIM comprises:
operating the WLAN transceiver to support the second SIM during a first period while the first SIM is in a first SIM active mode.

6. The method of claim 5, wherein operating the WLAN transceiver to support the second SIM during the first period while the first SIM is in the first SIM active mode further comprises:
processing, with a receive chain of the WLAN transceiver, a first signal received at the UE from a WWAN for the second SIM during the first period; and
processing, with a transmit chain of the WWAN transceiver, a second signal to be transmitted from the UE to the WWAN for the second SIM during the first period.

7. The method of claim 5, wherein operating the WWAN transceiver to support the second SIM during the first period further comprises:
processing, with a receive chain of the WWAN transceiver, a first signal received at the UE from a WWAN for the second SIM during the first period; and
processing, with a transmit chain of the WLAN transceiver, a second signal to be transmitted from the UE to the WWAN for the second SIM during the first period.

8. The method of claim 5, wherein selectively operating the WWAN transceiver and the WLAN transceiver to support the second SIM further comprises:
operating the WWAN transceiver to support the second SIM during a second period while the first SIM is in a first SIM standby mode and the second SIM is in a second SIM standby mode.

9. The method of claim 5, wherein selectively operating the WWAN transceiver and the WLAN transceiver to support the second SIM further comprises:
operating the WWAN transceiver to support the second SIM during a second period while the first SIM is in a first SIM standby mode and the second SIM is in a second SIM active mode.

10. The method of claim 5, wherein selectively operating the WWAN transceiver and the WLAN transceiver to support the second SIM further comprises:
operating the WLAN transceiver to support the second SIM during a second period while the first SIM is in a first SIM standby mode and the second SIM is in a second SIM active mode.

11. The method of claim 1, wherein selectively operating the WWAN transceiver and the WLAN transceiver to support the second SIM further comprises:
detecting a voice call for the second SIM; and
switching from operating the WWAN transceiver to support the second SIM during a first period while the first SIM is in a first SIM standby mode to operating the WLAN transceiver to support the second SIM during a second period while the first SIM is in a first SIM active mode.

12. The method of claim 11, wherein operating the WLAN transceiver to support the second SIM during the second period while the first SIM is in the first SIM active mode comprises:
operating one of a receive chain or a transmit chain of the WLAN transceiver to support the second SIM during the second period while the first SIM is in the first SIM active mode.

13. The method of claim 11, wherein detecting the voice call for the second SIM comprises:
receiving, at the UE, a page for the voice call from a WWAN.

14. The method of claim 11, wherein the voice call comprises a global system for mobile communications (GSM) voice call.

15. The method of claim 1, wherein selectively operating the WWAN transceiver and the WLAN transceiver to support the second SIM further comprises:
terminating a voice call for the second SIM; and
switching from operating the WLAN transceiver to support the second SIM during a first period while the first SIM is in a first SIM active mode to operating the WWAN transceiver to support the second SIM during a second period while the first SIM is in a first SIM standby mode.

16. The method of claim 15, wherein operating the WWAN transceiver to support the second SIM during the second period while the first SIM is in the first SIM standby mode comprises:
operating one of a receive chain or a transmit chain of the WWAN transceiver to support the second SIM during the second period while the first SIM is in the first SIM standby mode.

17. The method of claim 1, wherein selectively operating the WWAN transceiver and the WLAN transceiver to support the second SIM comprises:
operating the WLAN transceiver to support a second SIM active mode, regardless of a first SIM active mode.

18. The method of claim 17, wherein selectively operating the WWAN transceiver and the WLAN transceiver to support the second SIM further comprises:
operating the WLAN transceiver to support a second SIM standby mode, regardless of the first SIM active mode.

19. The method of claim 17, wherein selectively operating the WWAN transceiver and the WLAN transceiver to support the second SIM further comprises:
operating the WWAN transceiver to support a second SIM standby mode, regardless of the first SIM active mode.

20. The method of claim 17, wherein operating the WLAN transceiver to support the second SIM active mode, regardless of the first SIM active mode comprises:
processing, with a receive chain of the WLAN transceiver, a first signal received at the UE from a WWAN for the second SIM; and
processing, with a transmit chain of the WWAN transceiver, a second signal to be transmitted from the UE to the WWAN for the second SIM.

21. The method of claim 17, wherein operating the WLAN transceiver to support the second SIM active mode, regardless of the first SIM active mode comprises:
processing, with a receive chain of the WWAN transceiver, a first signal received at the UE from a WWAN for the second SIM; and
processing, with a transmit chain of the WLAN transceiver, a second signal to be transmitted from the UE to the WWAN for the second SIM.

22. The method of claim 1, further comprising:
detecting that the first SIM has switched from a first SIM standby mode to a first SIM active mode; and
switching from operating the WWAN transceiver to support the second SIM to operating one of a receive chain or a transmit chain of the WLAN transceiver to support the second SIM while the first SIM is in the first SIM active mode.

23. The method of claim 1, further comprising:
detecting that the first SIM has switched from a first SIM active mode to a first SIM standby mode; and
switching from operating the WLAN transceiver to support the second SIM to operating one of a receive chain or a transmit chain of the WWAN transceiver to support the second SIM while the first SIM is in the first SIM active mode.

24. The method of claim 1, further comprising:
operating the WLAN transceiver to support a WLAN function of the UE that is unrelated to support of the first SIM and that is unrelated to support of the second SIM; and
switching operation of the WWAN transceiver to support the second SIM while operating the WLAN transceiver to support the WLAN function.

25. An apparatus for wireless communication, comprising:
means for operating a wireless wide area network (WWAN) transceiver to support a first subscriber identity module (SIM) of a user equipment (UE); and
means for selectively operating the WWAN transceiver and a wireless local area network (WLAN) transceiver to support a second SIM of the UE.

26. The apparatus of claim 25, comprising:
means for detecting that the first SIM has switched from a first SIM standby mode to a first SIM active mode; and
means for transferring from operating the WWAN transceiver to support the second SIM to operating the WLAN transceiver to support the second SIM.

27. An apparatus for wireless communication, comprising:
a processor;
memory in electronic communication with the processor; and
instructions stored in the memory, the instructions being executable by the processor to:
operate a wireless wide area network (WWAN) transceiver to support a first subscriber identity module (SIM) of a user equipment (UE); and
selectively operate the WWAN transceiver and a wireless local area network (WLAN) transceiver to support a second SIM of the UE.

28. The apparatus of claim 27, wherein the instructions stored in the memory further comprise instructions executable by the processor to:
operate the WLAN transceiver to support the second SIM;
detect that the first SIM has switched from a first SIM standby mode to a first SIM active mode; and
transfer from operating the WWAN transceiver to support the second SIM to operating the WLAN transceiver to support the second SIM.

29. A non-transitory computer-readable medium storing computer-executable code for wireless communication, the code executable by a processor to:
operate a wireless wide area network (WWAN) transceiver to support a first subscriber identity module (SIM) of a user equipment (UE); and
selectively operate the WWAN transceiver and a wireless local area network (WLAN) transceiver to support a second SIM of the UE.

30. The non-transitory computer-readable medium of claim 29, wherein the code is further executable by the processor to:
detect that the first SIM has switched from a first SIM standby mode to a first SIM active mode; and
transfer from operating the WWAN transceiver to support the second SIM to operating the WLAN transceiver to support the second SIM.

* * * * *